US012148315B2

(12) United States Patent
Faccin

(10) Patent No.: US 12,148,315 B2
(45) Date of Patent: Nov. 19, 2024

(54) FLIGHT PATH REPORTING FORMAT FOR UNMANNED AERIAL VEHICLES

(71) Applicant: QUALCOMM Incorporated, San Diego, CA (US)

(72) Inventor: Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 17/226,480

(22) Filed: Apr. 9, 2021

(65) Prior Publication Data
US 2021/0343152 A1 Nov. 4, 2021

Related U.S. Application Data

(60) Provisional application No. 63/018,444, filed on Apr. 30, 2020.

(51) Int. Cl.
G08G 5/00 (2006.01)
B64C 39/02 (2023.01)
B64U 101/00 (2023.01)

(52) U.S. Cl.
CPC .......... G08G 5/006 (2013.01); B64C 39/024 (2013.01); G08G 5/0013 (2013.01); G08G 5/003 (2013.01); B64U 2101/00 (2023.01)

(58) Field of Classification Search
None
See application file for complete search history.

(56) References Cited

U.S. PATENT DOCUMENTS 9,990,854 B1 * 6/2018 Elmasry ............... G08G 5/0026
2009/0118997 A1 5/2009 Truitt
(Continued)

FOREIGN PATENT DOCUMENTS

| CN | 107690680 A | 2/2018 |
| CN | 110589018 A | 12/2019 |
| WO | WO-2018189576 A1 | 10/2018 |

OTHER PUBLICATIONS

"Reports of mail discussion—Flight path information" by Huawei et al., May 25, 2018. Available at: https://www.3gpp.org/ftp/TSG_RAN/WG2_RL2/TSGR2_102/Docs/R2-1807475.zip , retrieved on Feb. 14, 2023, available on or before Nov. 20, 2018. (Year: 2018).*

(Continued)

Primary Examiner — Maceeh Anwari
Assistant Examiner — Charles Pall
(74) Attorney, Agent, or Firm — Harrity & Harrity, LLP

(57) ABSTRACT

Exchange of flight path information between a mobile network and an unmanned aerial vehicle (UAV) assumes a particular format for the flight path information, usually a waypoint format. However, there are many circumstances in which the mobile network may prefer flight path information in other formats, such as polygon formats (also referred to as "flight volume formats"). Techniques and apparatuses described herein provide greater flexibility with respect to formatting requests for flight path information and encoding responses to such requests. For example, a base station may transmit a request for flight path information with a format indicator that informs a UAV of a desired format for the requested flight path information. The UAV may then provide the flight path information according to the format indicator.

30 Claims, 14 Drawing Sheets

(56) References Cited

U.S. PATENT DOCUMENTS

| | | | |
|---|---|---|---|
| 2013/0085669 A1* | 4/2013 | Bailey | G08G 5/0013 |
| | | | 701/467 |
| 2016/0307447 A1* | 10/2016 | Johnson | H04W 4/021 |
| 2018/0155052 A1 | 6/2018 | Lacroix et al. | |
| 2018/0348766 A1* | 12/2018 | Lewis | G08G 5/0069 |
| 2019/0122566 A1* | 4/2019 | Flotte | G08G 5/045 |
| 2019/0306675 A1 | 10/2019 | Xue et al. | |
| 2020/0077415 A1* | 3/2020 | Tang | G08G 5/0069 |
| 2021/0350717 A1* | 11/2021 | Yamada | G08G 5/0082 |

OTHER PUBLICATIONS

Huawei (Email Discussion Rapporteur): "Report of Email Discussion [101bis#57] [LTE/UAV] Flight Path Information", 3GPP Draft, 3GPP TSG-RAN WG2 #102, R2-1807475 Report of Email Discussion 101BIS#57LTEUAV Flight Path Information, 3rd Generation Partnership Project (3GPP), Mobile Competence Centre, 650, Route Des Lucioles, F-06921 Sophia—, vol. RAN WG2. No. Busan, Korea, May 21, 2018-May 25, 2018 May 11, 2018 (May 11, 2018), XP051464691, 9 Pages, Retrieved from the Internet: URL:http://www.3gpp.org/ftp/tsg%5Fran/WG2%5FRL2/TSGR2%5F102/Docs, [retrieved on May 11, 2018] p. 2-p. 4.
International Search Report and Written Opinion—PCT/US2021/026833—ISAEPO—Jul. 8, 2021.
Huawei (Email Discussion Rapporteur): "Report of Email Discussion [101bis#57][LTE/UAV] Flight Path Information", 3GPP TSG-RAN WG2 #102, R2-1807475, Busan, Korea, May 21, 2018-May 25, 2018, 9 Pages, May 11, 2018.

\* cited by examiner

FLIGHT PATH REPORTING FORMAT FOR UNMANNED AERIAL VEHICLES

CROSS-REFERENCE TO RELATED APPLICATION

This patent application claims priority to U.S. Provisional Patent Application No. 63/018,444, filed on Apr. 30, 2020, entitled "FLIGHT PATH REPORTING FORMAT FOR UNMANNED AERIAL VEHICLES," and assigned to the assignee hereof. The disclosure of the prior application is considered part of and is incorporated by reference into this patent application.

BACKGROUND

Field

Aspects of the present disclosure generally relate to wireless communication and to techniques and apparatuses for flight path reporting for unmanned aerial vehicles.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

Exchange of flight path information between a mobile network and an unmanned aerial vehicle (UAV) assumes a particular format for the flight path information, usually a waypoint format. However, there are circumstances in which a base station or other portion of the mobile network may prefer flight path information in other formats, such as polygon formats (also referred to as "flight volume formats"). For example, the UAV may be required to register a flight path with a governing body in a particular format that is not a waypoint format. The UAV may expend computing resources reencoding the flight path into waypoints when the base station requests flight path information, even when the base station could readily use the particular format required by the governing body. In another example, the base station may use a particular format to calculate radio access network (RAN) handoff of the UAV to another base station. The base station may expend computing resources reencoding the waypoints received from the UAV into the particular format used for the RAN handoff, even when the UAV already had available a copy of the flight path encoded in the particular format.

Some techniques and apparatuses described herein provide greater flexibility with respect to formatting requests for flight path information and encoding responses to such requests. For example, techniques and apparatuses described herein may provide an indicator of a format for flight path information included in a container for the flight path information. Accordingly, a base station may transmit a request with the indicator that informs a UAV of a desired format for requested flight path information. The UAV may then provide the flight path information in the container encoded according to the format indicator.

The flexibility provided by the techniques and apparatuses described herein may reduce computing resources expended by the UAV and/or the mobile network in providing and/or using flight path information. For example, the UAV may conserve computing resources when the mobile network provides a format indicator that requests flight path information in a format in which the UAV already has the flight path information stored. In another example, the mobile network may conserve computing resources by requesting flight path information in a format that the mobile network may use directly rather than converting from another format (e.g., reencoding a series of waypoints) provided by the UAV.

In an aspect of the disclosure, a method, a user equipment (UE), a network node, a network device, an apparatus, and a computer program product are provided.

In some aspects, the method may be performed by a UE. The method may include receiving an indication of a format of a plurality of formats for reporting flight path information to a network node; receiving a request for the flight path information; and transmitting the flight path information to the network node according to the format and based at least in part on receiving the request for the flight path information.

In some aspects, the UE may include a memory and one or more processors operatively coupled to the memory. The memory and the one or more processors may be configured to receive an indication of a format of a plurality of formats for reporting flight path information to a network node; receive a request for the flight path information; and transmit the flight path information to the network node according to the format and based at least in part on receiving the request for the flight path information.

In some aspects, the apparatus may include means for receiving an indication of a format of a plurality of formats for reporting flight path information to a network node; means for receiving a request for the flight path information; and means for transmitting the flight path information to the network node according to the format and based at least in part on receiving the request for the flight path information.

In some aspects, the computer program product may include a non-transitory computer-readable medium storing one or more instructions. The one or more instructions, when executed by one or more processors of a UE, may cause the one or more processors to receive an indication of a format of a plurality of formats for reporting flight path information to a network node; receive a request for the flight path information; and transmit the flight path information to the network node according to the format and based at least in part on receiving the request for the flight path information.

In some aspects, the method may be performed by a network node. The method may include transmitting, to a UE, an indication of a format of a plurality of formats for reporting flight path information of the UE; transmitting, to the UE, a request for the flight path information; and receiving the flight path information from the UE according to the format and based at least in part on transmitting the request for the flight path information.

In some aspects, the network node may include a memory and one or more processors operatively coupled to the memory. The memory and the one or more processors may be configured to transmit, to a UE, an indication of a format of a plurality of formats for reporting flight path information of the UE; transmit, to the UE, a request for the flight path information; and receive the flight path information from the UE according to the format and based at least in part on transmitting the request for the flight path information.

In some aspects, the apparatus may include means for transmitting, to a UE, an indication of a format of a plurality of formats for reporting flight path information of the UE; means for transmitting, to the UE, a request for the flight path information; and means for receiving the flight path information from the UE according to the format and based at least in part on transmitting the request for the flight path information.

In some aspects, the computer program product may include a non-transitory computer-readable medium storing one or more instructions. The one or more instructions, when executed by one or more processors of a network node, may cause the one or more processors to transmit, to a UE, an indication of a format of a plurality of formats for reporting flight path information of the UE; transmit, to the UE, a request for the flight path information; and receive the flight path information from the UE according to the format and based at least in part on transmitting the request for the flight path information.

In some aspects, the method may be performed by a network device. The method may include receiving information that identifies a UE and a format of a plurality of formats for reporting flight path information by the UE; identifying a base station that serves the UE; and transmitting, to the base station, a format indicator that identifies the format and a UE identifier that identifies the UE.

In some aspects, the network device may include a memory and one or more processors operatively coupled to the memory. The memory and the one or more processors may be configured to receive information that identifies a UE and a format of a plurality of formats for reporting flight path information by the UE; identify a base station that serves the UE; and transmit, to the base station, a format indicator that identifies the format and a UE identifier that identifies the UE.

In some aspects, the apparatus may include means for receiving information that identifies a UE and a format of a plurality of formats for reporting flight path information by the UE; means for identifying a base station that serves the UE; and means for transmitting, to the base station, a format indicator that identifies the format and a UE identifier that identifies the UE.

In some aspects, the computer program product may include a non-transitory computer-readable medium storing one or more instructions. The one or more instructions, when executed by one or more processors of a network device, may cause the one or more processors to receive information that identifies a UE and a format of a plurality of formats for reporting flight path information by the UE; identify a base station that serves the UE; and transmit, to the base station, a format indicator that identifies the format and a UE identifier that identifies the UE.

Aspects generally include a method, apparatus, system, computer program product, non-transitory computer-readable medium, user equipment, base station, network node, network device, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
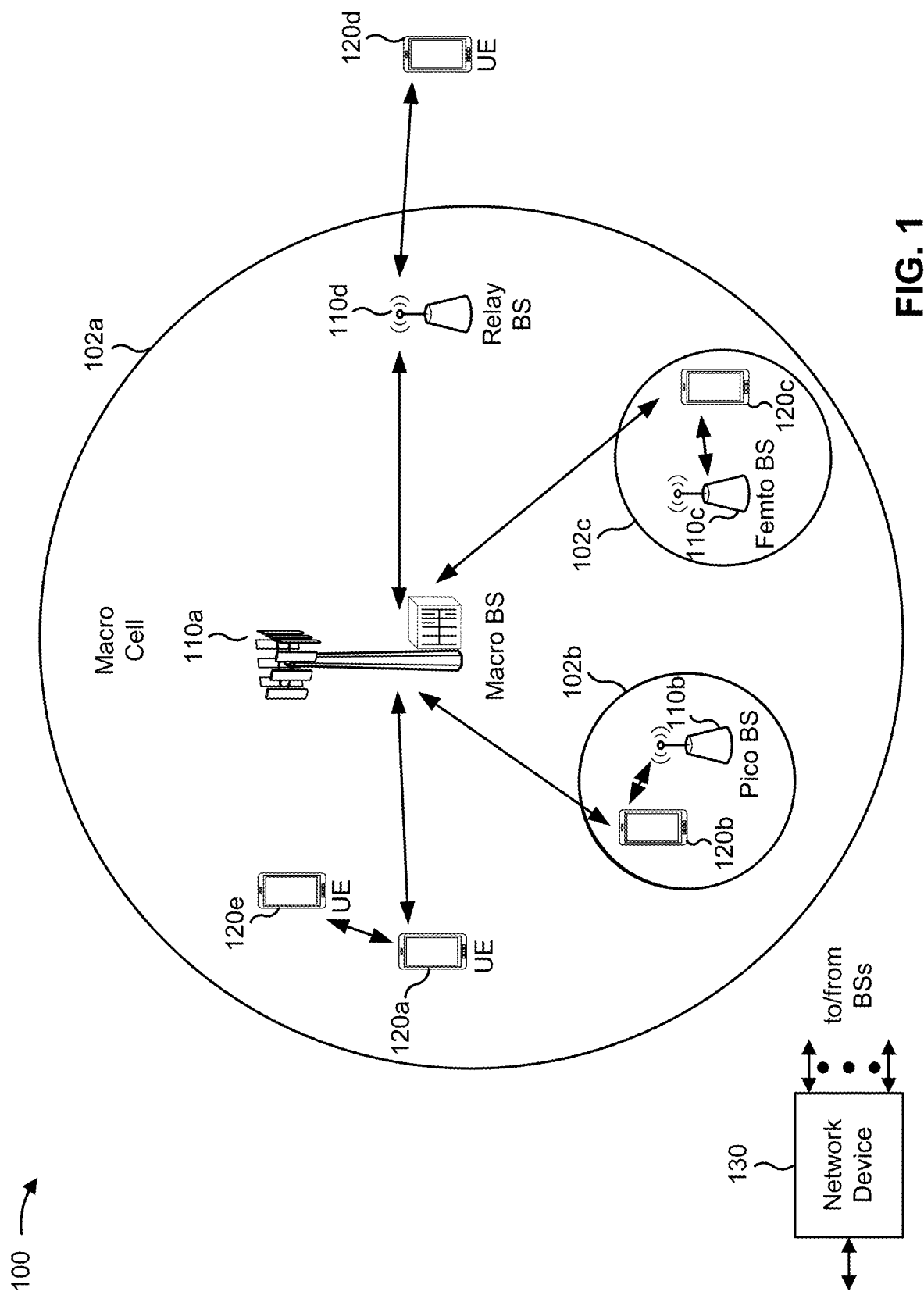
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network device 130 may couple to a set of BSs and may provide coordination and control for these BSs. Network device 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources. The resources may be scheduled based at least in part on a mobility of the UEs using the wireless communication network. For example, when the UEs are unmanned aerial vehicles (UAVs), the wireless communication network may schedule resources based at least in part on flight paths of the UAVs. The wireless communication network may use the flight paths to assign base stations to serve the UEs and to determine when mobility of the UEs warrants a handoff between base stations in the wireless communication network.

As indicated above, FIG. 1 is provided merely as an example. Other examples may differ from what is described with regard to FIG. 1.

Figure 2:
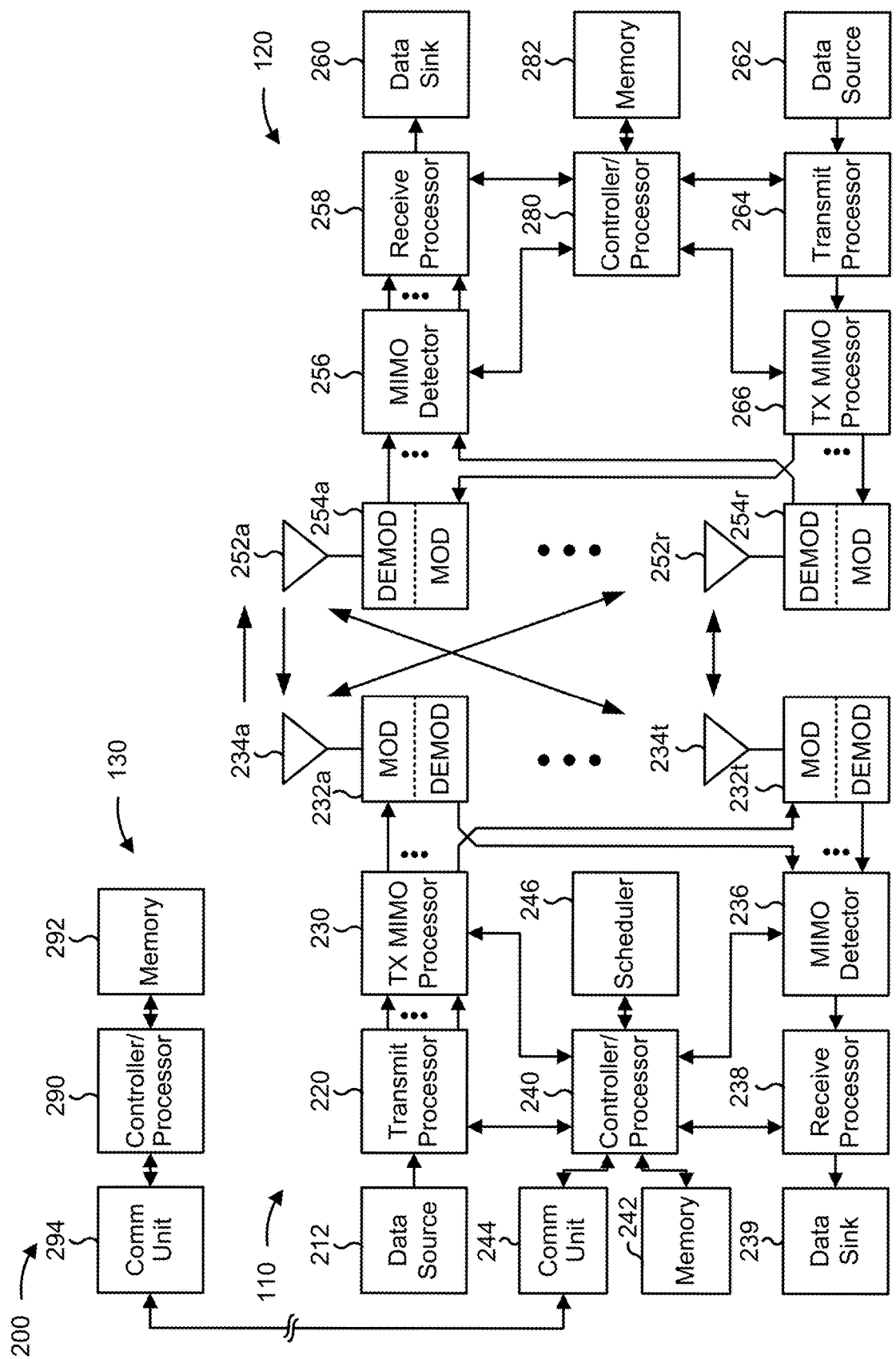
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS) or demodulation reference signal (DRMS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine a reference signal received power (RSRP) parameter, a received signal strength indicator (RSSI) parameter, a reference signal received quality (RSRQ) parameter, a channel quality indicator (CQI) parameter, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network device 130 via communication unit 244. Network device 130 may include communication unit 294, controller/processor 290, and memory 292.

Controller/processor 240 of base station 110, controller/processor 280 of UE 120, controller/processor 290 of network device(s) 130, and/or any other component(s) of FIG. 2 may perform one or more techniques associated with flight path reporting for unmanned aerial vehicles, as described in more detail elsewhere herein. For example, controller/processor 240 of base station 110, controller/processor 280 of UE 120, controller/processor 290 of network device(s) 130, and/or any other component(s) of FIG. 2 may perform or direct operations of, for example, method 600 of FIG. 6, method 700 of FIG. 7, method 800 of FIG. 8, and/or other processes as described herein. Memories 242, 282, and 292 may store data and program codes for BS 110, UE 120, and network device(s) 130, respectively. A scheduler 246 may schedule UEs for data transmission on the downlink and/or uplink.

As indicated above, FIG. 2 is provided merely as an example. Other examples may differ from what is described with regard to FIG. 2.

Figure 3:
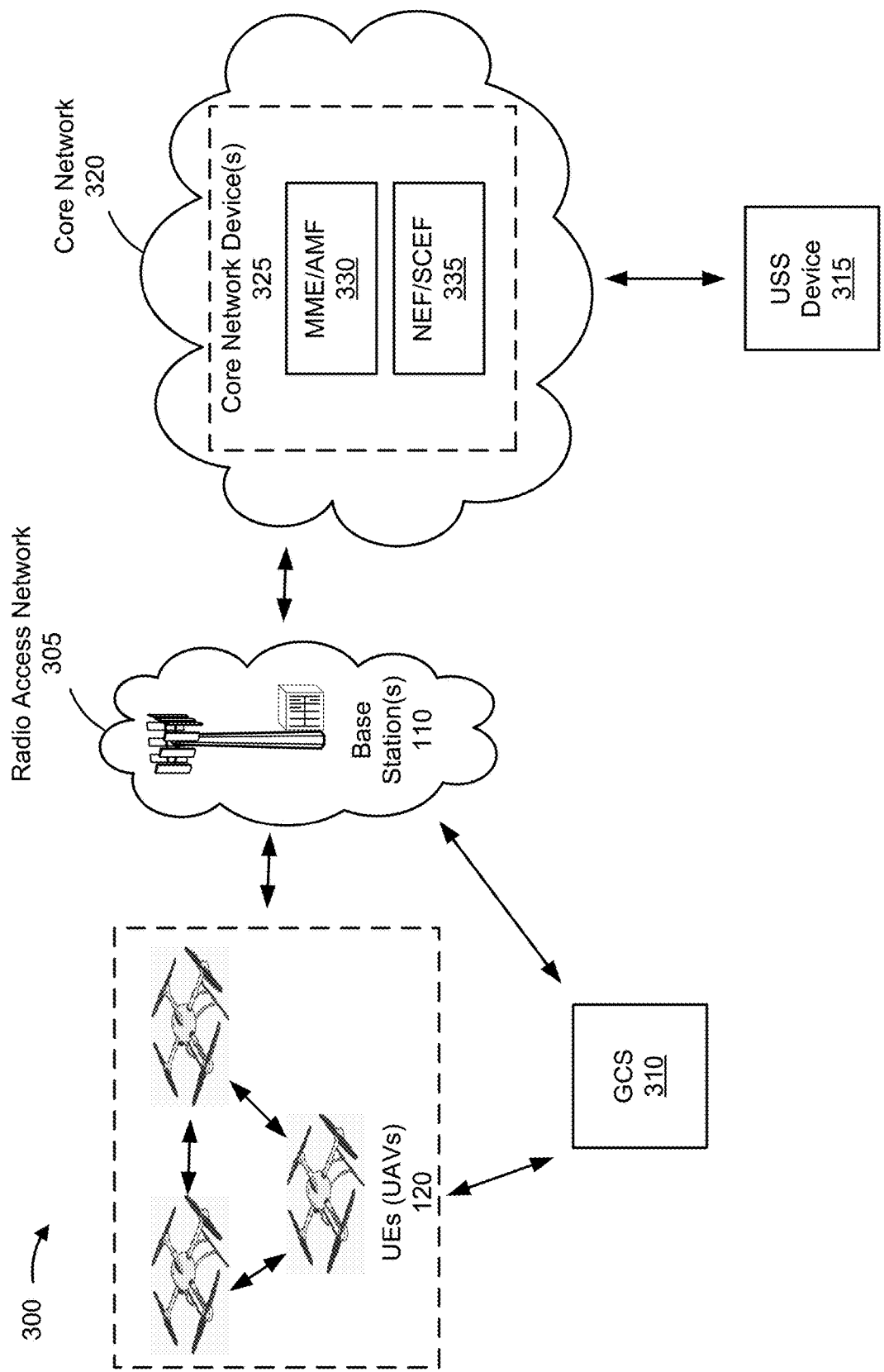
FIG. 3 is a diagram illustrating an example of unmanned aerial vehicles (UAVs) within a wireless communication network.

FIG. 3 is a diagram illustrating an example of UAVs 120 within a wireless communication network environment 300. As shown in FIG. 3, the environment 300 can include one or more UEs 120, which may include one or more UAVs 120 (hereinafter referred to individually as "UAV 120," and collectively as "UAVs 120"), a radio access network (RAN) 305, a core network 320, a UAV supplier service (USS) device 315, and a ground control system (GCS) 310. Devices of environment 300 can interconnect via wired connections, wireless connections, or a combination of wired and wireless connections.

The UAV 120 includes an aircraft without a human pilot aboard and can also be referred to as an unmanned aircraft (UA), a drone, a remotely piloted vehicle (RPV), a remotely piloted aircraft (RPA), or a remotely operated aircraft (ROA). The UAV 120 can have a variety of shapes, sizes, configurations, characteristics, and/or the like for a variety of purposes and applications. In some implementations, the UAV 120 can include one or more sensors, such as an electromagnetic spectrum sensor (e.g., a visual spectrum, infrared, or near infrared camera, a radar system, and/or the like), a biological sensor, a temperature sensor, a chemical sensor, and/or the like. In some implementations, the UAV 120 can include one or more components for communicating with one or more base stations 110. Additionally, or alternatively, the UAV 120 can transmit information to and/or can receive information from the GCS 310, such as sensor data, flight plan information, and/or the like. Such information can be communicated directly (e.g., via a radio resource control (RRC) signal and/or the like) and/or via the base stations 110 on the RAN 305.

The RAN 305 includes one or more radio access networks such as, for example, a code division multiple access (CDMA) RAN, a time division multiple access (TDMA) RAN, a frequency division multiple access (FDMA) RAN, a universal terrestrial radio access network (UTRAN), an evolved UTRAN (E-UTRAN) (e.g., a long-term evolution (LTE) RAN, an LTE-Advanced (LTE-A) RAN, an LTE-unlicensed (LTE-U) RAN, and/or the like), and/or the like. The RAN 305 can include one or more base stations 110 that provide access for the UAVs 120 to the core network 320.

Base station 110 includes one or more devices capable of transferring traffic, such as audio, video, text, and/or other traffic, destined for and/or received from the UAV 120. In some implementations, the base station 110 can include an evolved NodeB (eNB) associated with an LTE RAN that receives traffic from and/or sends traffic to the GCS 310 and/or a USS device 315 via the core network 320. Additionally, or alternatively, one or more base stations 110 can be associated with a RAN that is not associated with the LTE network.

The base station 110 can send traffic to and/or receive traffic from the UAV 120 via an air interface. The base stations 110 can include different types of base stations, such as a macro cell base station or a small cell base station (e.g., a micro cell base station, a pico cell base station, and/or a femto cell base station). A macro cell base station can cover a relatively large geographic area (e.g., several kilometers in radius). A small cell base station can be a lower-powered base station, as compared with a macro cell base station, that can operate in the same or different (e.g., licensed, unlicensed, etc.) frequency bands as macro cell base stations.

The GCS 310 includes one or more devices capable of managing the UAVs 120 and/or flight plans for the UAVs 120. For example, the GCS 310 can include a server device, a desktop computer, a laptop computer, or a similar device. In some implementations, the GCS 310 can communicate with one or more devices of the environment 300 (e.g., the UAV 120, the USS device 315, and/or the like) to receive information regarding flight plans for the UAVs 120 and/or to provide recommendations associated with such flight plans, as described elsewhere herein. In some implementations, the GCS 310 can permit a user to control the UAVs 120. Additionally, or alternatively, the GCS 310 can use a neural network and/or other artificial intelligence (AI) to control the UAVs 120. In some implementations, the GCS 310 can be included in a data center, a cloud computing environment, a server farm, and/or the like, which can include multiple GCSs 310. While shown as being external from the core network 320, in some aspects, the GCS 310 can reside at least partially within the core network 320.

The USS device 315 includes one or more devices capable of receiving, storing, processing, and/or providing information associated with the UAVs 120 and/or the GCS 310. For example, the USS device 315 can include a desktop computer, a laptop computer, a tablet computer, a mobile phone, or a similar device. In some implementations, the UAVs 120 can interact with the USS device 315 to register a flight plan; receive approval, analysis, and/or recommendation related to a flight plan; and/or the like.

The core network 320 includes a network that enables communications between the RAN 305 (e.g., the base stations 110) and one or more devices and/or networks connected to the core network 320. For example, the core network 320 can include an evolved packet core (EPC). The core network 320 can include one or more core network devices 325, such as one or more mobility management entities (MMEs) and/or access and mobility management functions (AMFs) (herein after referred to as a "MME/AMF") 330, one or more network exposure functions (NEFs) and/or service capability exposure function (SCEFs) (herein after referred to as a "NEF/SCEF") 335, and/or other entities and/or functions that provide mobility functions for the UAVs 120 and enable the UAVs 120 to communicate with other devices of the environment 300.

The MME/AMF 330 includes one or more network devices, such as one or more server devices, capable of managing authentication, activation, deactivation, and/or mobility functions associated with the UAV 120 connected to the core network 320. In some implementations, the MME/AMF 330 may perform operations relating to authentication of the UAV 120. The MME/AMF 330 may perform operations associated with handing off the UAV 120 from a first base station 110 to a second base station 110 when the UAV 120 is transitioning from a first cell associated with the first base station 110 to a second cell associated with the second base station 110. Additionally, or alternatively, the MME/AMF 330 may select another MME and/or AMF (not pictured), to which the UAV 120 should be handed off (e.g., when the UAV 120 moves out of range of the MME/AMF 330). In some implementations, the MME/AMF 330 may communicate with the UAV 120 (e.g., via the base station 110) to obtain information concerning a location of the UAV 120 and/or a reachability of the UAV 120 and may send the information to the NEF/SCEF 335.

The NEF/SCEF 335 includes one or more network exposure devices, such as one or more server devices, capable of exposing capabilities, events, information, and/or the like in one or more wireless networks to help other devices in the one or more wireless networks discover network services and/or utilize network resources efficiently. In some implementations, the NEF/SCEF 335 may include a NEF associated with a 5G network and/or a SCEF associated with an LTE network that receives traffic from and/or sends traffic to the UAV 120 via the MME/AMF 330 and the base station 110, and that receives traffic from and/or sends traffic to the USS device 315. In some implementations, the NEF/SCEF 335 may obtain a data structure, such as an approval of a flight plan for UAV 120, from the USS device 315 and divide the data structure into a plurality of data segments. In some implementations, the NEF/SCEF 335 may determine a location and/or reachability of the UAV 120 and/or a communication capability of the base station 110 to determine how to send the plurality of data segments to the UAV 120.

One or more of core network device(s) 325 may correspond to network device 130, as described above in connection with FIG. 1. The USS device 315 may communicate with core network 320 using one or more interfaces, such as a UAV flight management system (UFMS). The UFMS may be external from the GCS 310 or may, at least in part, reside at least partially within the GCS 310.

As indicated above, FIG. 3 is provided as an example. Other examples may differ from what is described with respect to FIG. 3.

Figure 4:
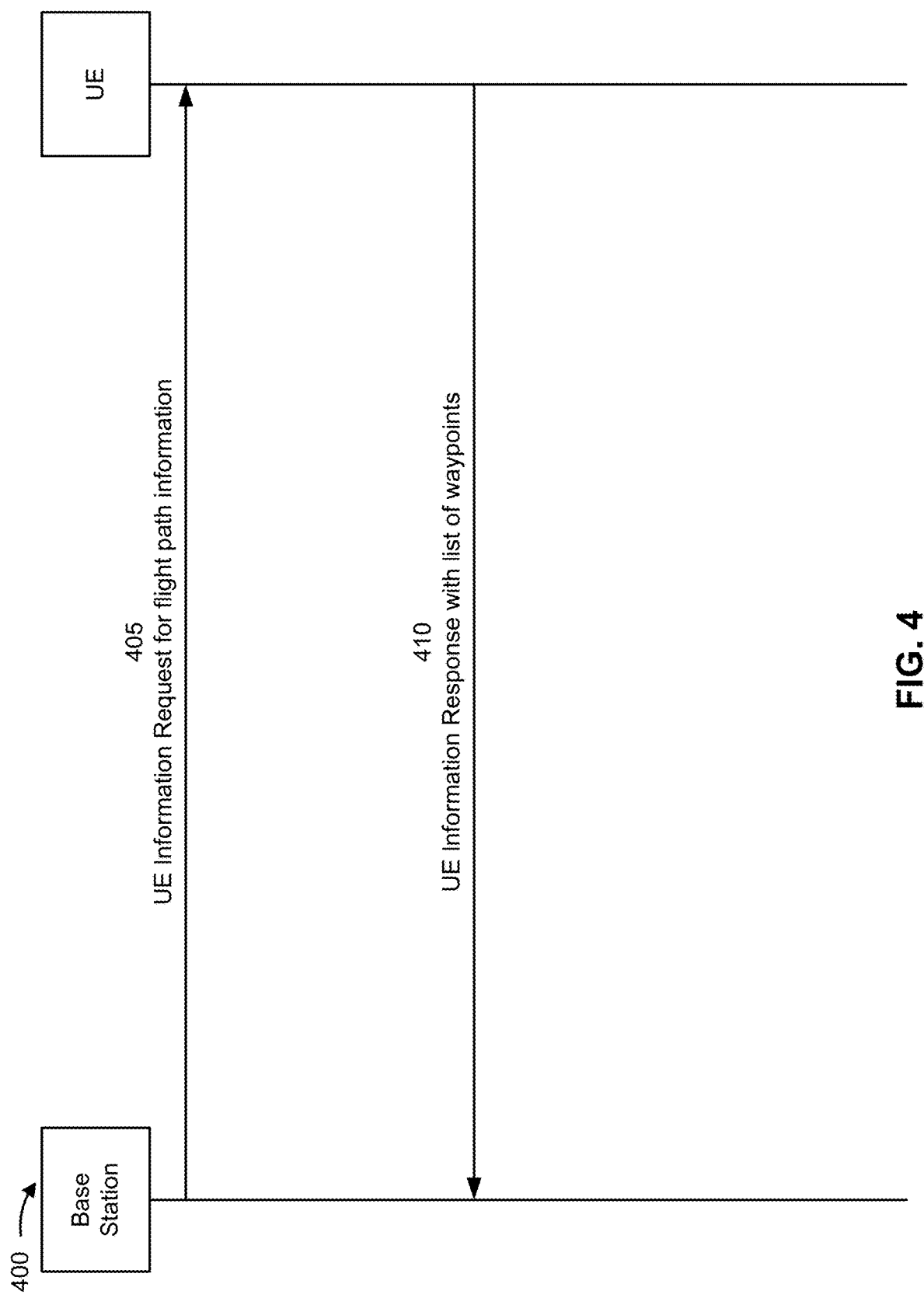
FIG. 4 is a diagram illustrating an example of flight path information exchange between a base station and a UE.

FIG. 4 is a diagram illustrating an example 400 of flight path information exchange between a base station and a UAV. As shown in FIG. 4, the UE, which may be a UAV, may communicate with the base station. For example, the UE may establish an RRC connection with the base station.

At 405, the base station may transmit, to the UE, a request for flight path information. For example, the base station may transmit a UEInformationRequest message with a flightPathInfoReq field included in the message and/or marked as "1," "TRUE," or any other indicator that flight path information is sought. The base station may assume the flight path information will be encoded as a series of waypoints for the UE.

In some aspects, the base station may transmit the message over the RRC connection. Additionally, or alternatively, the request may be sent to the UE as a non-access stratum (NAS) message by an MME/AMF of a core network serving the base station. In some aspects, the base station may set an includeTimeStamp Boolean to "1," "TRUE," and/or the like when the base station also requests that the UE include time stamps with the requested flight path information.

The UE may encode a response to the UEInformationRequest message in a FlightPathInfoReport container (e.g., as defined in 3GPP specifications). By using the FlightPathInfoReport container, the UE may implicitly indicate that the response is encoded as a series of waypoints. When available, the UE may populate timeStamp fields with time stamps at which the UE expects to arrive at the waypoints of the flight path. For example, the UE may populate the timeStamp fields based at least in part on determining that the includeTimeStamp Boolean is set to "1," "TRUE," and/or the like.

At 410, based at least in part on receiving the UEInformationRequest message from the base station, the UE may transmit, to the base station 110, a UEInformationResponse message with the filled FlightPathInfoReport container. In some aspects, the UE may transmit the response over the RRC connection. Additionally, or alternatively, the UE may transmit the response as a NAS message to the MME/AMF of the core network serving the base station.

The example exchange depicted in FIG. 4 assumes a particular format for the flight path information, usually a waypoint format, as described above. However, there are many circumstances in which the base station may prefer flight path information in other formats, such as polygon formats (also referred to as "flight volume formats") and/or the like. For example, the UAV may be required to register a flight path with a governing body in a particular format that is not a waypoint format. The UAV may expend computing resources reencoding the flight path into waypoints when the base station requests flight path information, even when the base station could readily use the particular format required by the governing body in lieu of the waypoint format. Additionally, or alternatively, the base station may use a particular format to calculate RAN handoff of the UAV to another base station. The base station may expend computing resources reencoding the flight path received from the UAV into the particular format used for the RAN handoff, even when the UAV already had available a copy of the flight path encoded in the particular format.

As indicated above, FIG. 4 is provided as an example. Other examples may differ from what is described with respect to FIG. 4.

Some techniques and apparatuses described herein in connection with FIGS. 5-14 provide greater flexibility with respect to formatting requests for flight path information and encoding responses to such requests. For example, techniques and apparatuses described herein may provide a FlightPathInfoReport definition that includes an indicator of a format for flight path information included in the FlightPathInfoReport container. While the description to follow will describe a flight path report definition as a FlightPathInfoReport definition and a flight path container as a FlightPathInfoReport container, the description equally applies to other types of definitions that include an indicator of a format for flight path information and to other types of containers that can carry flight path information, respectively. Accordingly, a base station may transmit a UEInformationRequest message with a FlightPathInfoFormat indicator that informs a UAV of a desired format for the requested flight path information. While the description to follow will describe a request message as a UEInformationRequest message and a flight path format indicator as a FlightPathInfoFormat indicator, the description equally applies to other types of messages that can carry requests for information and to other types of indicators that can inform of desired formats for flight path information, respectively. The UAV may then provide the flight path information in the FlightPathInfoReport container encoded according to the FlightPathInfoFormat indicator.

The flexibility provided by the techniques and apparatuses described herein may reduce computing resources expended by the UAV and/or the base station in providing and/or using flight path information. For example, the UAV may conserve computing resources when the base station provides a FlightPathInfoFormat indicator that requests flight path information in a format in which the UAV already has the flight path information stored. Additionally, or alternatively, the base station may conserve computing resources by requesting flight path information in a format that the base station may use directly rather than having to convert from another format (e.g., reencoding a series of waypoints) provided by the UAV.

Figure 5:
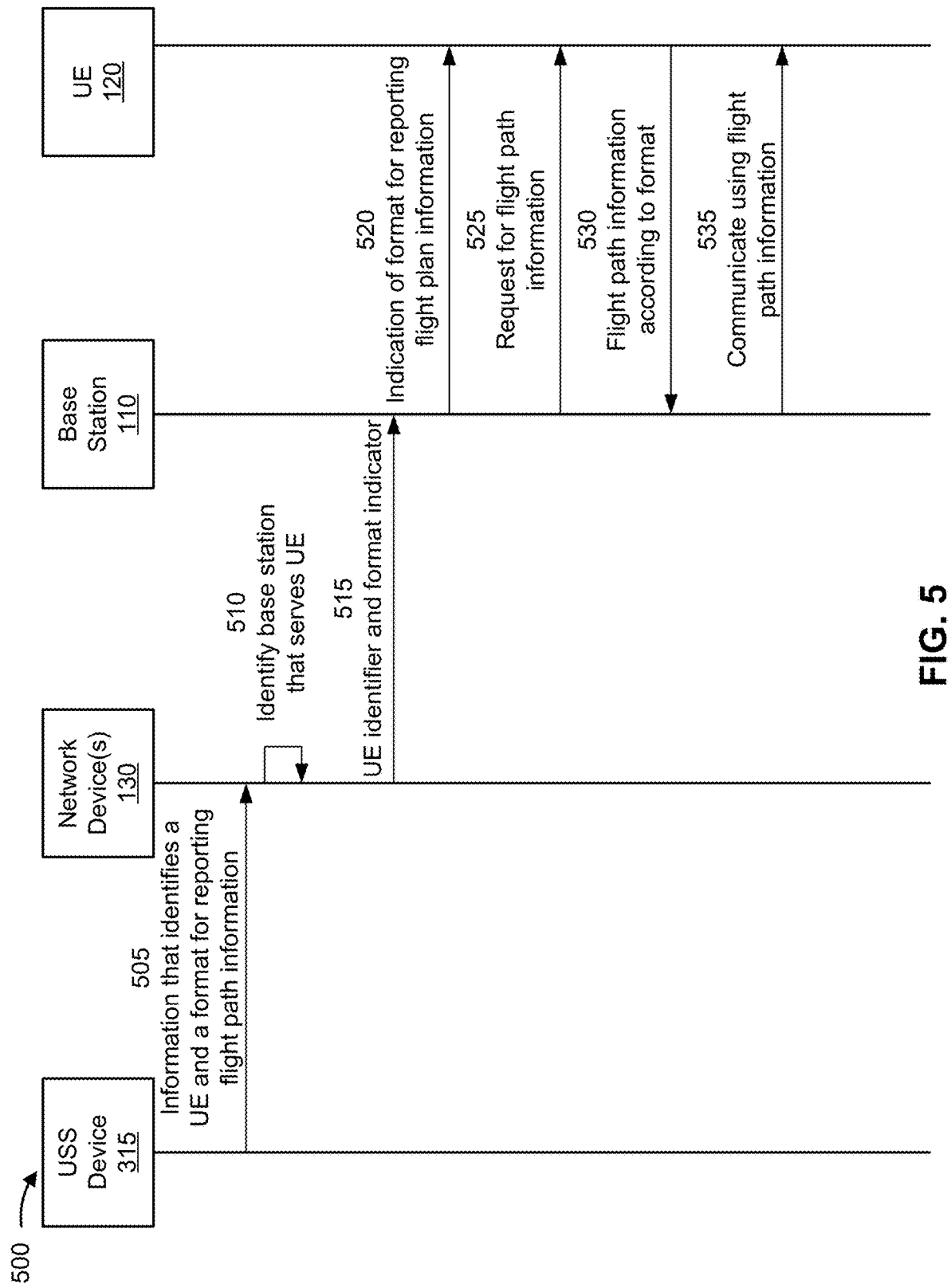
FIG. 5 is a diagram illustrating an example of flight path information exchange using defined formats between a base station and a UE.

FIG. 5 is a diagram illustrating an example 500 of flight path information exchange using defined formats between a base station 110 and a UE 120, in accordance with the present disclosure. As shown in FIG. 5, the UE 120 may communicate with one or more network nodes (e.g., the base station 110) on a mobile network (e.g., a 5G network, an LTE network, and/or the like). In the example shown in FIG. 5, the UE 120 communicates with base station 110 on the mobile network, e.g., using RRC signaling and/or the like. However, the description below applies equally to the UE 120 communicating with a portion (e.g., network device(s) 130) of a core network supporting the base station 110, such as an MME/AMF and/or the like, e.g., using NAS signaling and/or the like.

As further shown in FIG. 5, the core network may include one or more network devices, such as network device(s) 130. As described above in connection with FIG. 3, network device(s) 130 may be an MME/AMF, a NEF/SCEF, a UFMS, and/or the like. The network device(s) 130 may communicate with a USS device 315, e.g., via the UFMS and/or another similar interface as described above in connection with FIG. 3.

At 505, the network device(s) 130 may receive, from the USS device 315, information that identifies a UE (e.g., the UE 120) and a format of a plurality of formats for reporting flight path information by the UE 120. The plurality of formats may include at least a waypoint format and a polygon format (also referred to as a "flight volume format").

In some aspects, the information that identifies the UE 120 and the format may be received based at least in part on authorization of a flight plan of the UE 120. For example, the USS device 315 may transmit the information to the network device(s) 130 when the USS device 315 authorizes the flight plan. The USS device 315 may use the UFMS and/or another interface to transmit the information to the network device(s) 130.

In some aspects, the information that identifies the UE and the format are received from the USS device 315 or from a core network device that communicates with the USS device 315 (e.g., the network device(s) 130). For example, the information that identifies the UE 120 and the format may be received from the USS device 315 via a SCEF application programming interface (API) or a NEF API.

In some aspects, the information that identifies the UE 120 may include at least one of a UAV identifier, a general public subscription identifier (GPSI), another type of identifier, or a combination thereof. For example, the UAV identifier, the GPSI, and/or the other type of identifier may have been assigned by the USS device 315 during registration of the UAV 120 with the USS device 315.

At 510, the network device(s) 130 may identify a base station (e.g., base station 110) that serves the UE 120. For example, the network device(s) 130 may include an MME/AMF serving the UE 120 and may obtain a stored indication of the base station 110 serving the UE 120. Additionally, or alternatively, the network device(s) 130 may include a NEF/SCEF that identifies the MME/AMF serving the UE 120.

At 515, the network device(s) 130 may transmit, to the base station 110, a format indicator that identifies the format and a UE identifier that identifies the UE 120. In some aspects, the network device(s) 130 may include an MME/

AMF serving the UE 120 that transmits the format indicator and the UE identifier to the base station 110. Additionally, or alternatively, the network device(s) 130 may include a NEF/SCEF that identifies the MME/AMF serving the UE 120 and that transmits the format indicator and the UE identifier to the MME/AMF for delivery to the base station 110.

In some aspects, the UE identifier may include at least one of a UAV identifier, a GPSI, or a combination thereof. The UE identifier may be the same identifier received by the network device(s) 130, as described above in connection with reference number 505, or may be a different identifier. For example, the network device(s) 130 may receive a UAV identifier, obtain a GPSI corresponding to the UAV identifier, and transmit the GPSI. In another example, the network device(s) 130 may receive the GPSI, obtain a UAV identifier corresponding to the GPSI, and transmit the UAV identifier. In yet another example, the network device(s) 130 may receive a first UAV identifier assigned by the USS device 315, obtain a second UAV identifier corresponding to the first UAV identifier and assigned by the network device(s) 130 and/or the base station 110, and transmit the second UAV identifier.

In some aspects, the format indicator and the UE identifier are transmitted to the base station 110 based at least in part on authorization of a flight plan of the UE 120. For example, when approving the flight plan of the UE 120, the USS device 315 may transmit information (e.g., the information identifying the UE 120 and/or the format for reporting flight path information by the UE 120 described above in connection with reference number 505) to the network device(s) 130 that triggers the network device(s) 130 to transmit the format indicator and the UE identifier to the base station 110.

At 520, the base station 110 may transmit, to the UE 120, an indication of a format of a plurality of formats for reporting flight path information of the UE 120 to a network node (e.g., the base station 110). In some aspects, the format may be a static format stored in memory of the UE 120. For example, the UE 120 may store flight path information according to the static format, e.g., a polygon format or other format. Additionally, or alternatively, the base station 110 may obtain the format indicator as described above in connection with reference number 515.

Additionally, or alternatively, the format may be determined based at least in part on a format indicator and a UE identifier that identifies the UE. For example, the format indicator and the UE identifier may be received from the network device(s) 130, as described above in connection with reference number 515. In some aspects, the format indicator and the UE identifier may be received based at least in part on authorization of a flight plan of the UE 120, as described above in connection with reference number 515.

In some aspects, the format for reporting the flight path information may be indicated in at least one of a configuration message or a NAS message. For example, as described above, the format indicator may be included in an RRC message from the base station 110. Additionally, or alternatively, as described above, the format indicator may be included in a NAS message from the MME/AMF and/or the like.

As described above, the format for reporting the flight path information may be indicated in a flight path information report configuration information element of the message. For example, the format indicator may be a FlightPathInfoFormat element defined in a FlightPathInfoReportConfig container for the message. While the description to follow will describe a flight path format indicator as a FlightPathInfoFormat element and a flight path report container as a FlightPathInfoReportConfig container, the description equally applies to other types of elements that can indicate formats for flight path information and to other types of containers that can carry flight path information, respectively.

In some aspects, the base station 110 may transmit the indication based at least in part on the indicator received from the network device(s) 130, as described above in connection with reference number 515. Additionally, or alternatively, the base station 110 may transmit the indication based at least in part on obtaining a stored indicator of a format preferred by the base station 110. For example, the base station 110 may store an indicator based on a preference of the base station 110 for flight path information in a polygon format or other format.

At 525, the base station 110 may transmit, to the UE 120, a request for the flight path information. In some aspects, the request and the indication may be transmitted together. For example, the base station 110 may combine transmissions associated with reference numbers 520 and 525 by sending a UEInformationRequest message including a FlightPathInfoFormat element serving as the indication. As an alternative, the request and the indication may be transmitted separately.

In some aspects, the request may be indicated using a flight path information request field of a UE information request message. For example, as described above, the request may use a flightPathInfoReq field (e.g., marked to "1" or "TRUE" or another value) within a UEInformationRequest message to indicate the request. While the description to follow will describe a request field as a flightPathInfoReq field, the description equally applies to other types of fields that can indicate requests for information. The base station 110 may transmit the UEInformationRequest message to the UE 120.

At 530, based at least in part on receiving the request for the flight path information, the UE 120 may transmit, to a network node (e.g., the base station 110), the flight path information according to the format. In some aspects, the flight path information may be transmitted in a flight path information report. For example, as described above, the UE 120 may transmit a UEInformationResponse message with a FlightPathInfoReport container filled with the flight path information. While the description to follow will describe a response message as a UEInformationResponse message and a flight path information container as a FlightPathInfoReport container, the description equally applies to other types of messages that can carry responses and to other types of containers that can carry flight path information, respectively. The FlightPathInfoReport container may conform to a FlightPathInfoReportConfig definition.

In some aspects, as described above, the UE 120 may include respective times associated with the flight path information in the UEInformationResponse message. For example, the UE 120 may include at least one of respective times that the UE 120 is expected to arrive at waypoints of a set of waypoints indicated in the flight path information when the format is a waypoint format; respective times that the UE 120 is expected to occupy polygons of a set of polygons indicated in the flight path information when the format is a polygon format; and/or the like.

In some aspects, the respective times that the UE 120 is expected to occupy the polygons of the set of polygons may include at least one of respective times that the UE 120 is expected to enter the polygons; respective times that the UE 120 is expected to exit the polygons; respective durations of time that the UE 120 is expected to occupy the polygons; and/or a combination thereof. The UE 120 may include the respective times that the UE 120 is expected to occupy the polygons of the set of polygons based at least in part on determining that an includeTimeStamp Boolean included in the UEInformationRequest message is set to "1," "TRUE," and/or the like. While the description to follow will describe a time stamp indicator as an includeTimeStamp Boolean, the description equally applies to other types of indicators that the UE can use to determine whether to include respective times with flight path information.

The base station 110 may receive the flight path information based at least in part on transmitting the request for the flight path information. For example, the base station 110 may receive the UEInformationResponse message from the UE 120 in response to transmitting the UEInformationResponse message to the UE 120.

At 535, the base station 110 may communicate with the UE 120 using the received flight path information. For example, the base station 110 may manage RAN handoff of the UE 120 to another base station using the received flight path information and/or perform one or more other types of communication with the UE 120 based at least in part on the received flight path information.

As indicated above, FIG. 5 is provided as an example. Other examples may differ from what is described with respect to FIG. 5.

Figure 6:
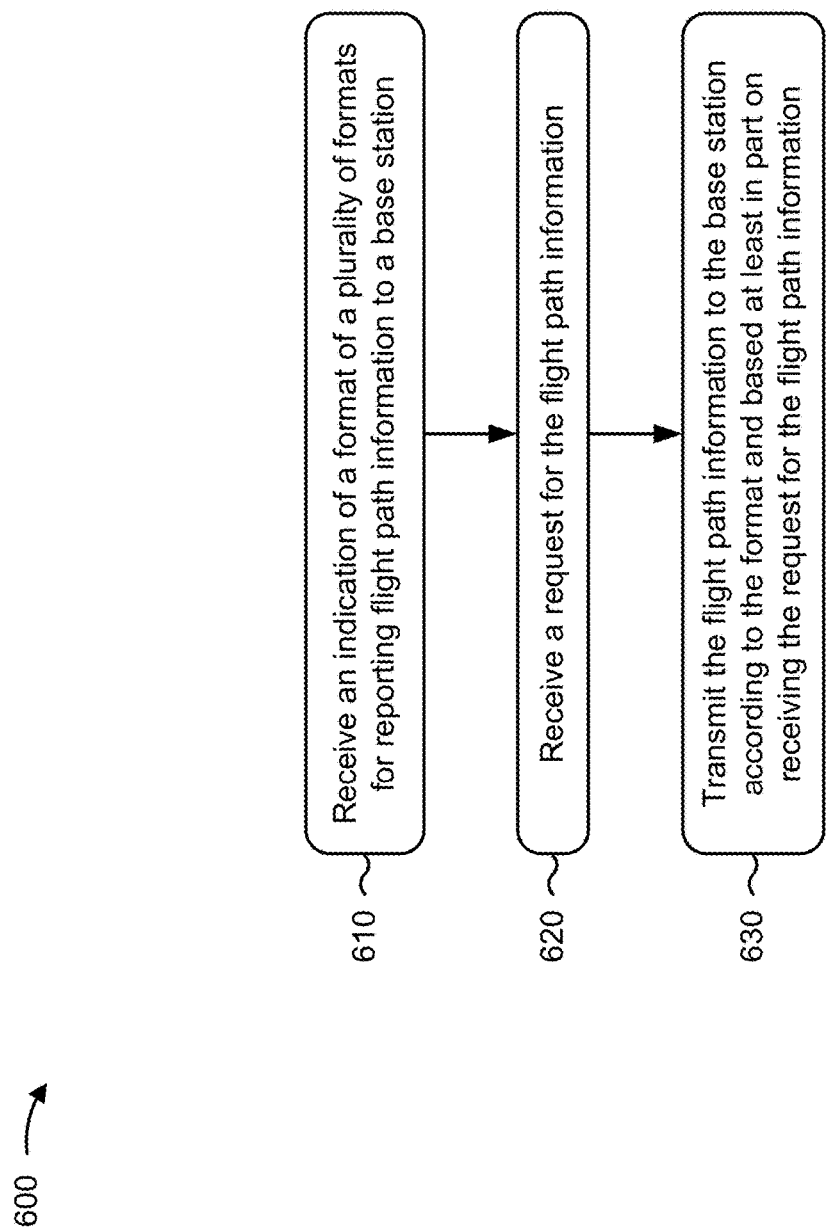
FIG. 6 is a flowchart of a method of wireless communication performed by a UE.

FIG. 6 is a flowchart of a method 600 of wireless communication. The method may be performed by a UE (e.g., the UE 120 of FIG. 1, the apparatus 902 of FIG. 9, and/or the like).

At 610, the UE may receive an indication of a format of a plurality of formats for reporting flight path information to a network node. For example, the UE (e.g., using receive processor 258, transmit processor 264, controller/processor 280, memory 282, and/or the like) may receive the indication of the format for reporting flight path information to the network node, as described above. In some aspects, the plurality of formats may include at least a waypoint format and a polygon format (also referred to as a "flight volume format"). In some aspects, the format for reporting the flight path information may be indicated in at least one of a configuration message (e.g., an RRC message) or a NAS message.

At 620, the UE may receive a request for the flight path information. For example, the UE (e.g., using receive processor 258, transmit processor 264, controller/processor 280, memory 282, and/or the like) may receive the request for the flight path information, as described above. In some aspects, the request may include the indication of the format as described above in connection with reference number 610 or may be received separately. In some aspects, the request may be indicated using a flight path information request field of a UE information request message.

At 630, the UE may transmit the flight path information to the network node according to the format. For example, the UE (e.g., using receive processor 258, transmit processor 264, controller/processor 280, memory 282, and/or the like) may transmit the flight path information to the network node according to the format and based at least in part on receiving the request for the flight path information, as described above. In some aspects, the flight path information may be transmitted in a flight path information report. In some aspects, the flight path information may indicate at least one of respective times that the UE is expected to arrive at waypoints of a set of waypoints indicated in the flight path information if the format is a waypoint format or respective times that the UE is expected to occupy polygons of a set of polygons indicated in the flight path information if the format is a polygon format.

Method 600 may include additional aspects, such as any single aspect or any combination of aspects described below and/or in connection with one or more other processes described elsewhere herein.

In a first aspect, the plurality of formats includes at least a waypoint format and a polygon format.

In a second aspect, alone or in combination with the first aspect, the format for reporting the flight path information is indicated in at least one of a configuration message or a non-access stratum message.

In a third aspect, alone or in combination with one or more of the first and second aspects, the format for reporting the flight path information is indicated in a flight path information report configuration information element of the configuration message.

In a fourth aspect, alone or in combination with one or more of the first through third aspects, the request is indicated using a flight path information request field of a UE information request message.

In a fifth aspect, alone or in combination with one or more of the first through fourth aspects, the flight path information is transmitted in a flight path information report.

In a sixth aspect, alone or in combination with one or more of the first through fifth aspects, the flight path information indicates at least one of: respective times that the UE is expected to arrive at waypoints of a set of waypoints indicated in the flight path information if the format is a waypoint format, or respective times that the UE is expected to occupy polygons of a set of polygons indicated in the flight path information if the format is a polygon format.

In a seventh aspect, alone or in combination with one or more of the first through sixth aspects, the respective times that the UE is expected to occupy the polygons of the set of polygons include at least one of: respective times that the UE is expected to enter the polygons, respective times that the UE is expected to exit the polygons, respective durations of time that the UE is expected to occupy the polygons, or a combination thereof.

Although FIG. 6 shows example blocks of method 600, in some aspects, method 600 may include additional blocks, fewer blocks, different blocks, or differently arranged blocks than those depicted in FIG. 6. Additionally, or alternatively, two or more of the blocks of method 600 may be performed in parallel.

Figure 7:
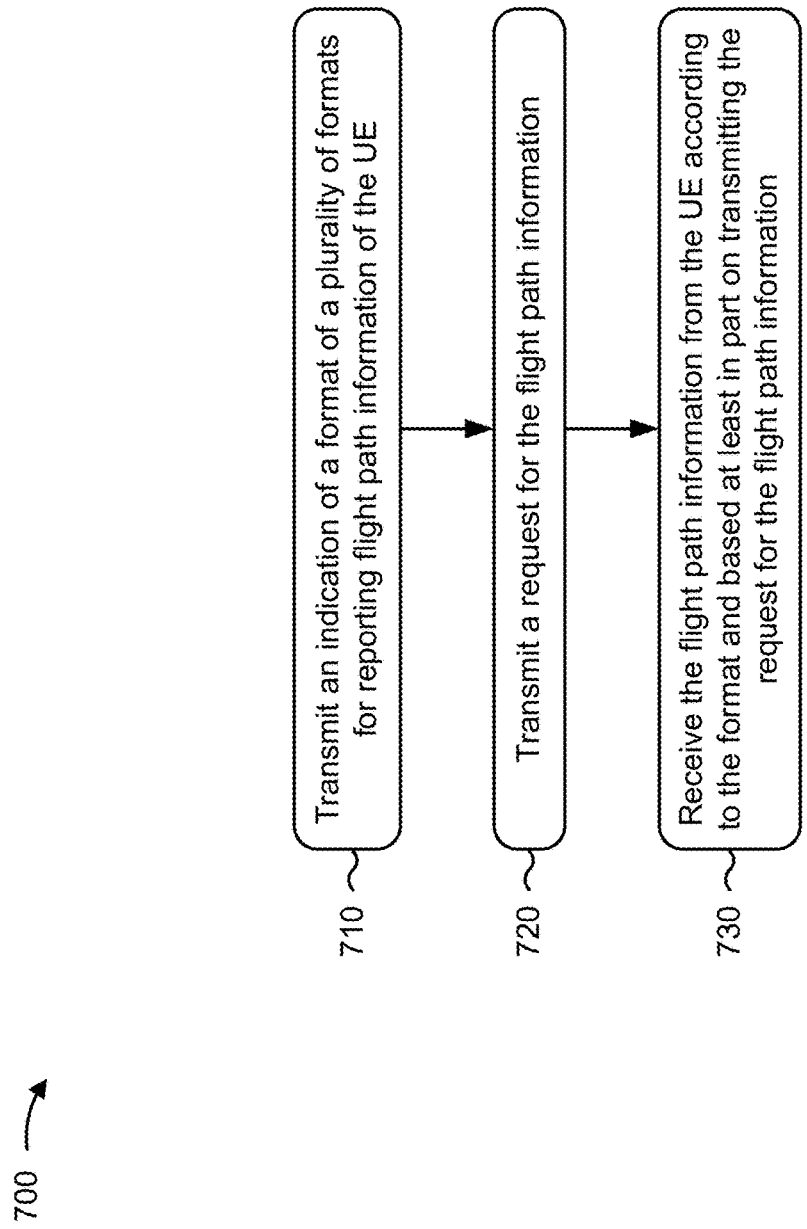
FIG. 7 is a flowchart of a method of wireless communication performed by a network node.

FIG. 7 is a flowchart of a method 700 of wireless communication. The method may be performed by a network node (e.g., the base station 110 of FIG. 1, the apparatus 1102 of FIG. 11, and/or the like).

At 710, the network node may transmit, to a UE, an indication of a format of a plurality of formats for reporting flight path information of the UE. For example, the network node (e.g., using receive processor 238, controller/processor 240, memory 242, and/or the like) may transmit, to the UE, the indication of the format for reporting flight path information of the UE, as described above. In some aspects, the plurality of formats may include at least a waypoint format and a polygon format (also referred to as a "flight volume format"). In some aspects, the format may be a static format stored in memory of the UE and/or may be determined based at least in part on a format indicator and a UE identifier that identifies the UE.

At 720, the network node may transmit, to the UE, a request for the flight path information. For example, the network node (e.g., using receive processor 238, controller/processor 240, memory 242, and/or the like) may transmit, to the UE, the request for the flight path information, as described above. In some aspects, the request may include the indication of the format as described above in connection with reference number 710 or may be transmitted separately. In some aspects, the request may be indicated using a flight path information request field of a UE information request message.

At 730, the network node may receive the flight path information from the UE according to the format. For example, the network node (e.g., using receive processor 238, controller/processor 240, memory 242, and/or the like) may receive the flight path information from the UE according to the format and based at least in part on transmitting the request for the flight path information, as described above. In some aspects, the flight path information may be received in a flight path information report. In some aspects, the flight path information may indicate at least one of respective times that the UE is expected to arrive at waypoints of a set of waypoints indicated in the flight path information if the format is a waypoint format or respective times that the UE is expected to occupy polygons of a set of polygons indicated in the flight path information if the format is a polygon format.

Method 700 may include additional aspects, such as any single aspect or any combination of aspects described below and/or in connection with one or more other processes described elsewhere herein.

In a first aspect, the format is a static format stored in memory of the UE.

In a second aspect, alone or in combination with the first aspect, the format is determined based at least in part on a format indicator and a UE identifier that identifies the UE, the format indicator and the UE identifier are received from a network device in a core network associated with the network node.

In a third aspect, alone or in combination with one or more of the first and second aspects, the format indicator and the UE identifier are received based at least in part on authorization of a flight plan of the UE.

In a fourth aspect, alone or in combination with one or more of the first through third aspects, the plurality of formats includes at least a waypoint format and a polygon format.

In a fifth aspect, alone or in combination with one or more of the first through fourth aspects, the format for reporting the flight path information is indicated in at least one of a configuration message or a non-access stratum message.

In a sixth aspect, alone or in combination with one or more of the first through fifth aspects, the format for reporting the flight path information is indicated in a flight path information report configuration information element of the configuration message.

In a seventh aspect, alone or in combination with one or more of the first through sixth aspects, the request is indicated using a flight path information request field of a UE information request message.

In an eighth aspect, alone or in combination with one or more of the first through seventh aspects, the flight path information is received in a flight path information report.

In a ninth aspect, alone or in combination with one or more of the first through eighth aspects, the flight path information indicates at least one of: respective times that the UE is expected to arrive at waypoints of a set of waypoints indicated in the flight path information if the format is a waypoint format, or respective times that the UE is expected to occupy polygons of a set of polygons indicated in the flight path information if the format is a polygon format.

In a tenth aspect, alone or in combination with one or more of the first through ninth aspects, the respective times that the UE is expected to occupy the polygons of the set of polygons include at least one of: respective times that the UE is expected to enter the polygons, respective times that the UE is expected to exit the polygons, respective durations of time that the UE is expected to occupy the polygons, or a combination thereof.

Although FIG. 7 shows example blocks of method 700, in some aspects, method 700 may include additional blocks, fewer blocks, different blocks, or differently arranged blocks than those depicted in FIG. 7. Additionally, or alternatively, two or more of the blocks of method 700 may be performed in parallel.

Figure 8:
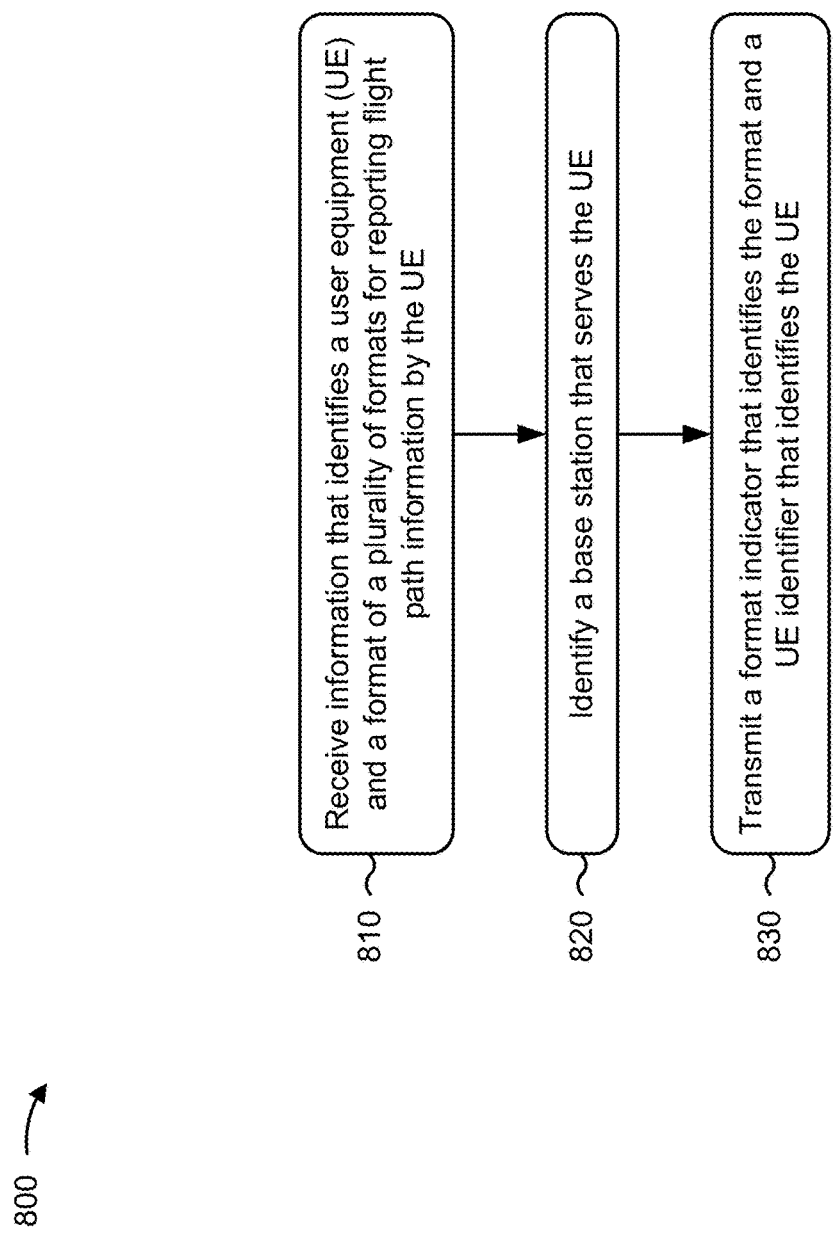
FIG. 8 is a flowchart of a method of wireless communication performed by a network device.

FIG. 8 is a flowchart of a method 800 of wireless communication. The method may be performed by a network device (e.g., the network device 130 of FIG. 1, the apparatus 1302 of FIG. 13, and/or the like).

At 810, the network device may receive information that identifies a UE and a format of a plurality of formats for reporting flight path information by the UE. For example, the network device (e.g., using receive processor 238, controller/processor 240, memory 242, and/or the like) may receive information that identifies the UE and the format for reporting flight path information by the UE, as described above. In some aspects, the plurality of formats may include at least a waypoint format and a polygon format (also referred to as a "flight volume format"). In some aspects, the information that identifies the UE and the format may be received from a USS device or from a core network device that communicates with the USS device.

At 820, the network device may identify a base station that serves the UE. For example, the network device (e.g., using receive processor 238, controller/processor 240, memory 242, and/or the like) may identify the base station that serves the UE, as described above. In some aspects, the network device may include an MME/AMF that serves the UE and identifies the base station that serves the UE. Additionally, or alternatively, the network device may include a NEF/SCEF that communicates with the MME/AMF that serves the UE to identify the base station that serves the UE.

At 830, the network device may transmit, to the base station, a format indicator that identifies the format and a UE identifier that identifies the UE. For example, the network device (e.g., using receive processor 238, controller/processor 240, memory 242, and/or the like) may transmit, to the base station, the format indicator and the UE identifier that identifies the UE, as described above. In some aspects, the UE identifier may be the same as the received information that identifies the UE. Additionally, or alternatively, the network device may determine the UE identifier based at least in part on the received information that identifies the UE.

Method 800 may include additional aspects, such as any single aspect or any combination of aspects described below and/or in connection with one or more other processes described elsewhere herein.

In a first aspect, the information that identifies the UE and the format are received based at least in part on authorization of a flight plan of the UE.

In a second aspect, alone or in combination with the first aspect, the format indicator and the UE identifier are transmitted to the base station based at least in part on authorization of a flight plan of the UE.

In a third aspect, alone or in combination with one or more of the first and second aspects, the information that identifies the UE and the format are received from a USS device or from a core network device that communicates with the USS device.

In a fourth aspect, alone or in combination with one or more of the first through third aspects, the information that identifies the UE and the format are received from the USS device via a SCEF API or a NEF API.

In a fifth aspect, alone or in combination with one or more of the first through fourth aspects, the information that identifies the UE includes at least one of an unmanned aerial vehicle identifier, a general public subscription identifier, or a combination thereof.

In a sixth aspect, alone or in combination with one or more of the first through fifth aspects, the UE identifier includes at least one of an unmanned aerial vehicle identifier, a general public subscription identifier, or a combination thereof.

In a seventh aspect, alone or in combination with one or more of the first through sixth aspects, the plurality of formats includes at least a waypoint format and a polygon format.

Although FIG. 8 shows example blocks of method 800, in some aspects, method 800 may include additional blocks, fewer blocks, different blocks, or differently arranged blocks than those depicted in FIG. 8. Additionally, or alternatively, two or more of the blocks of method 800 may be performed in parallel.

Figure 9:
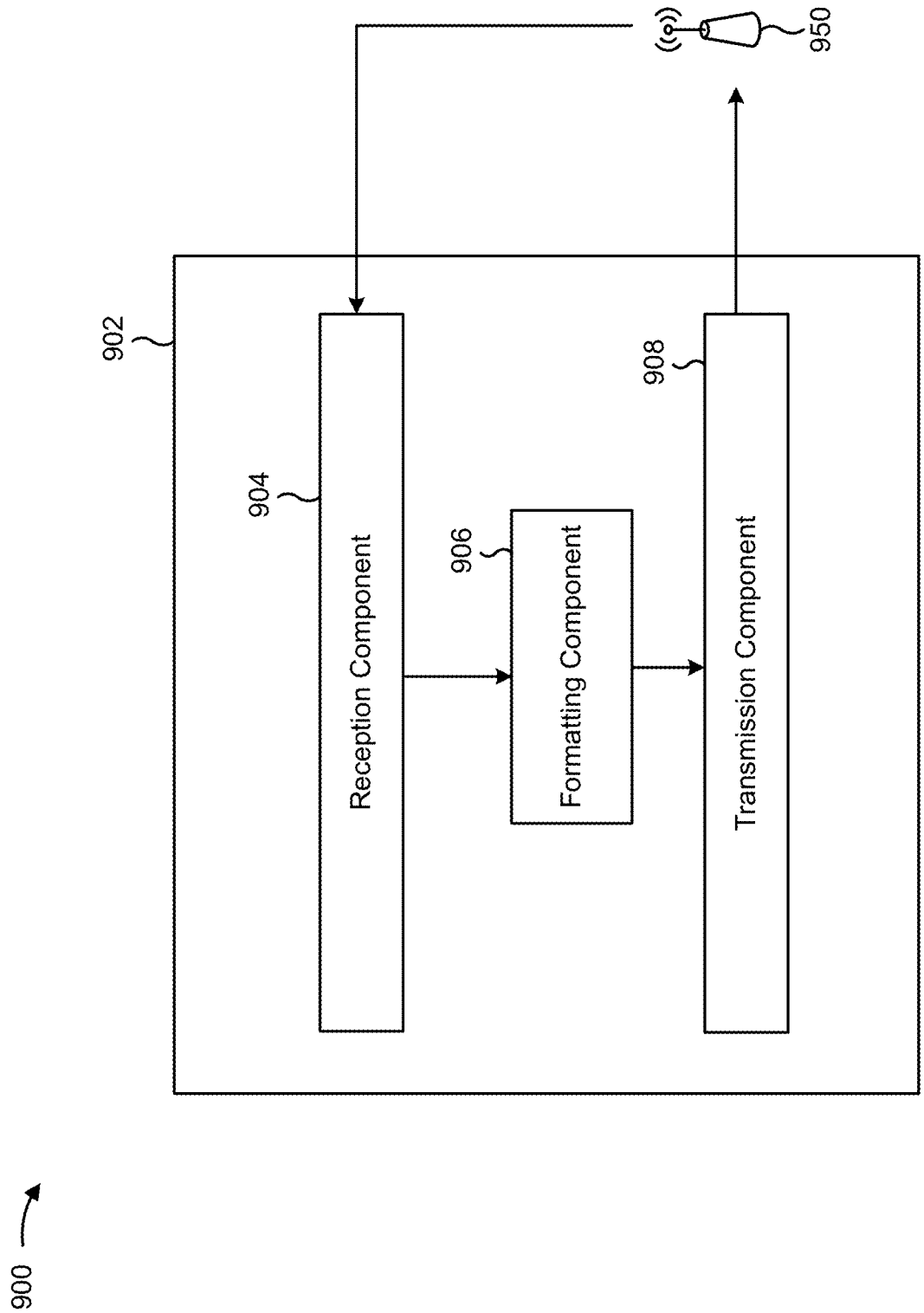
FIG. 9 is a conceptual data flow diagram illustrating the data flow between different components in an example apparatus.

FIG. 9 is a conceptual data flow diagram 900 illustrating the data flow between different components in an example apparatus 902. The apparatus 902 may be a UE (e.g., UE 120). In some aspects, the apparatus 902 includes a reception component 904, a formatting component 906, and/or a transmission component 908.

In some aspects, the reception component 904 may receive (e.g., from an apparatus 950, such as a network node, e.g., a base station, an MME/AMF, and/or the like) an indication of a format of a plurality of formats for reporting flight path information to a network node. The reception component 904 may further receive (e.g., from an apparatus 950, such as a network node, e.g., a base station, an MME/AMF, and/or the like) a request for the flight path information. In some aspects, the reception component 904 may receive the indication of the format as a portion of the request. Additionally, or alternatively, the reception component 904 may receive the indication of the format as a message that is separate from the request.

In some aspects, the formatting component 906 may determine the format in the indication received by the reception component 904. The formatting component 906 may further obtain the requested flight path information in the determined format. In some aspects, the formatting component 906 may reencode the flight path information if the apparatus 902 stores the flight path information in a format different from the determined format.

In some aspects, the transmission component 908 may transmit (e.g., to an apparatus 950, such as a network node, e.g., a base station, an MME/AMF, and/or the like) the flight path information to the network node according to the format. For example, the transmission component 908 may transmit a message with the flight path information obtained by the formatting component 906. The transmission component 908 may transmit the flight path information based at least in part on the reception component 904 receiving the request for the flight path information.

The apparatus may include additional components that perform each of the blocks of the algorithm in the aforementioned method 600 of FIG. 6 and/or the like. Each block in the aforementioned method 600 of FIG. 6 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

Figure 10:
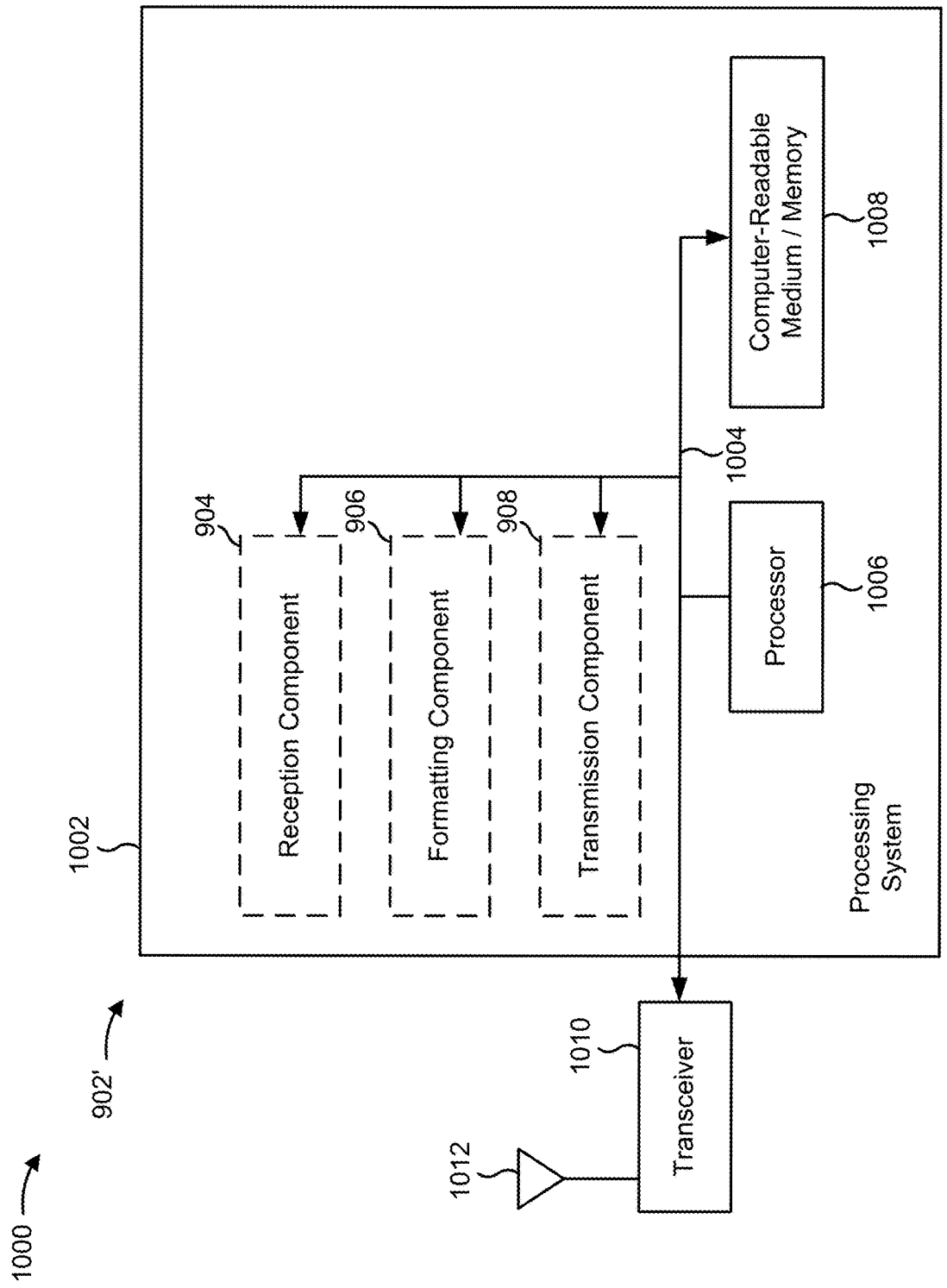
FIG. 10 is a diagram illustrating an example of a hardware implementation for an apparatus employing a processing system.

FIG. 10 is a diagram 1000 illustrating an example of a hardware implementation for an apparatus 902' employing a processing system 1002. The apparatus 902' may be a UE (e.g., UE 120).

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware components, represented by the processor 1006, the components 904, 906, and/or 908, and the computer-readable medium/memory 1008. The bus 1004 may also link various other circuits such as timing sources, peripherals, voltage regulators, and power management circuits, which are well known in the art, and therefore will not be described any further.

The processing system 1002 may be coupled to a transceiver 1010. The transceiver 1010 is coupled to one or more antennas 1012. The transceiver 1010 provides a means for communicating with various other apparatuses over a transmission medium. The transceiver 1010 receives a signal from the one or more antennas 1012, extracts information from the received signal, and provides the extracted information to the processing system 1002, specifically the reception component 906. In addition, the transceiver 1010 receives information from the processing system 1002, specifically the transmission component 908, and based at least in part on the received information, generates a signal to be applied to the one or more antennas 1012. The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described herein for any particular apparatus. The computer-readable medium/memory 1008 may also be used for storing data that is manipulated by the processor 1006 when executing software. The processing system further includes at least one of the components 904, 906, and/or 908. The components may be software modules running in the processor 1006, resident/stored in the computer-readable medium/memory 1008, one or more hardware modules coupled to the processor 1006, or some combination thereof. The processing system 1002 may be a component of the UE 120 and may include the memory 282 and/or at least one of the TX MIMO processor 266, the RX processor 258, and/or the controller/processor 280.

In some aspects, the apparatus 902/902' for wireless communication includes means for receiving an indication of a format of a plurality of formats for reporting flight path information to a network node; means for receiving a request for the flight path information; means for transmitting the flight path information to the network node according to the format and based at least in part on receiving the request for the flight path information; and/or the like. The aforementioned means may be one or more of the aforementioned components of the apparatus 902 and/or the processing system 1002 of the apparatus 902' configured to perform the functions recited by the aforementioned means. As described elsewhere herein, the processing system 1002 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

Figure 11:
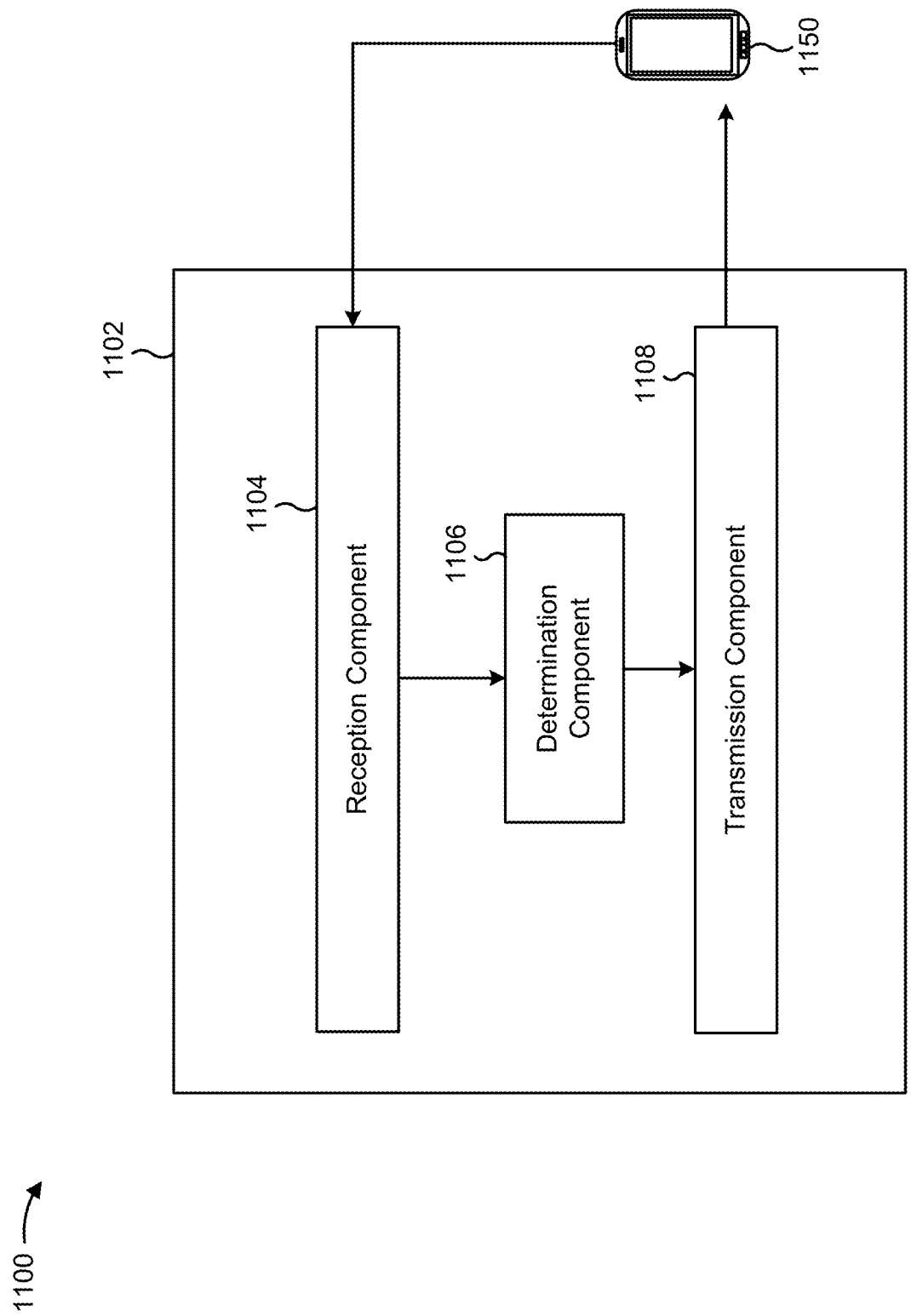
FIG. 11 is a conceptual data flow diagram illustrating the data flow between different components in an example apparatus.

FIG. 11 is a conceptual data flow diagram 1100 illustrating the data flow between different components in an example apparatus 1102. The apparatus 1102 may be a network node (e.g., base station 110). In some aspects, the apparatus 1102 includes a reception component 1104, a determination component 1106, and/or a transmission component 1108.

In some aspects, the determination component 1106 may determine of a format of a plurality of formats for reporting flight path information. In some aspects, the determination component 1106 may obtain a static format stored in memory of the UE (e.g., using reception component 1104 and/or transmission component 1108) or may obtain a static format associated with the apparatus 1102. Additionally, or alternatively, the determination component 1106 may determine the format based at least in part on a format indicator and a UE identifier that identifies the UE. For example, the format indicator and the UE identifier may be received (e.g., using reception component 1104) from a network device in a core network associated with the apparatus 1102.

In some aspects, the transmission component 1108 may transmit (e.g., to an apparatus 1150, such as a UE) an indication of the format for reporting flight path information. For example, the transmission component 1108 may use the format from the determination component 1106. The transmission component 1108 may further transmit (e.g., to an apparatus 1150, such as a UE) a request for the flight path information. In some aspects, the transmission component 1108 may include the indication of the format as a portion of the request. Additionally, or alternatively, the transmission component 1108 may transmit the indication of the format as a message that is separate from the request.

In some aspects, the reception component 1104 may receive (e.g., from an apparatus 1150, such as a UE) the flight path information according to the format. The reception component 1104 may receive the flight path information based at least in part on the transmission component 1108 transmitting the request for the flight path information.

The apparatus may include additional components that perform each of the blocks of the algorithm in the aforementioned method 700 of FIG. 7 and/or the like. Each block in the aforementioned method 700 of FIG. 7 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of components (e.g., one or more components) shown in FIG. 11 may perform one or more functions described as being performed by another set of components shown in FIG. 7.

Figure 12:
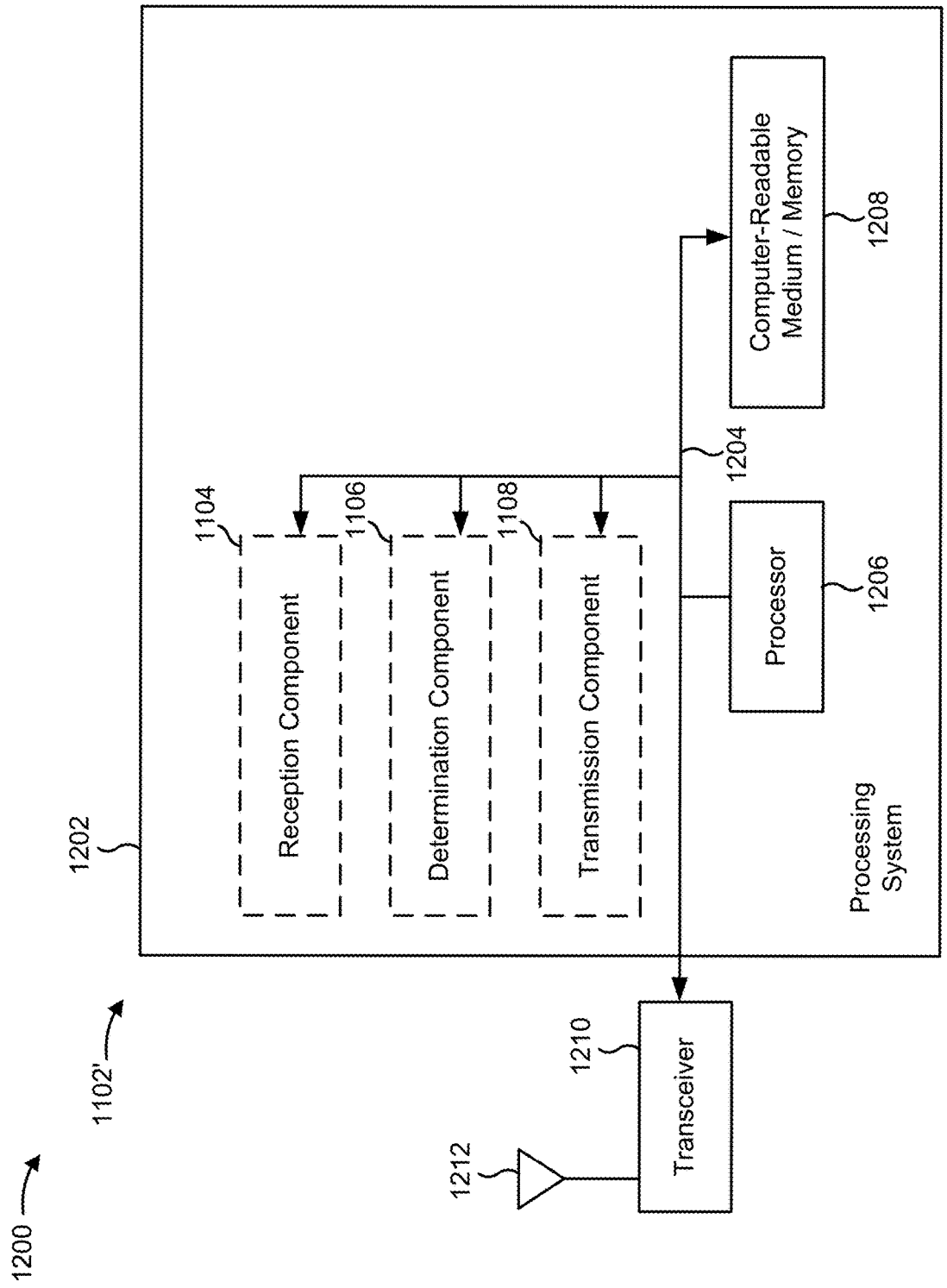
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be a network node (e.g., base station 110).

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware components, represented by the processor 1206, the components 1104, 1106, and/or 1108, and the computer-readable medium/memory 1208. The bus 1204 may also link various other circuits such as timing sources, peripherals, voltage regulators, and power management circuits, which are well known in the art, and therefore will not be described any further.

The processing system 1202 may be coupled to a transceiver 1210. The transceiver 1210 is coupled to one or more antennas 1212. The transceiver 1210 provides a means for communicating with various other apparatuses over a transmission medium. The transceiver 1210 receives a signal from the one or more antennas 1212, extracts information from the received signal, and provides the extracted information to the processing system 1202, specifically the reception component 1104. In addition, the transceiver 1210 receives information from the processing system 1202, specifically the transmission component 1108, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described herein for any particular apparatus. The computer-readable medium/memory 1208 may also be used for storing data that is manipulated by the processor 1206 when executing software. The processing system further includes at least one of the components 1104, 1106, and/or 1108. The components may be software modules running in the processor 1206, resident/stored in the computer-readable medium/memory 1208, one or more hardware modules coupled to the processor 1206, or some combination thereof. The processing system 1202 may be a component of the base station 110 and may include the memory 242 and/or at least one of the TX MIMO processor 230, the RX processor 238, and/or the controller/processor 240.

In some aspects, the apparatus 1102/1102' for wireless communication includes means for transmitting, to a UE, an indication of a format of a plurality of formats for reporting flight path information of the UE; means for transmitting, to the UE, a request for the flight path information; means for receiving the flight path information from the UE according to the format and based at least in part on transmitting the request for the flight path information; and/or the like. The aforementioned means may be one or more of the aforementioned components of the apparatus 1102 and/or the processing system 1202 of the apparatus 1102' configured to perform the functions recited by the aforementioned means. As described elsewhere herein, the processing system 1202 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

Figure 13:
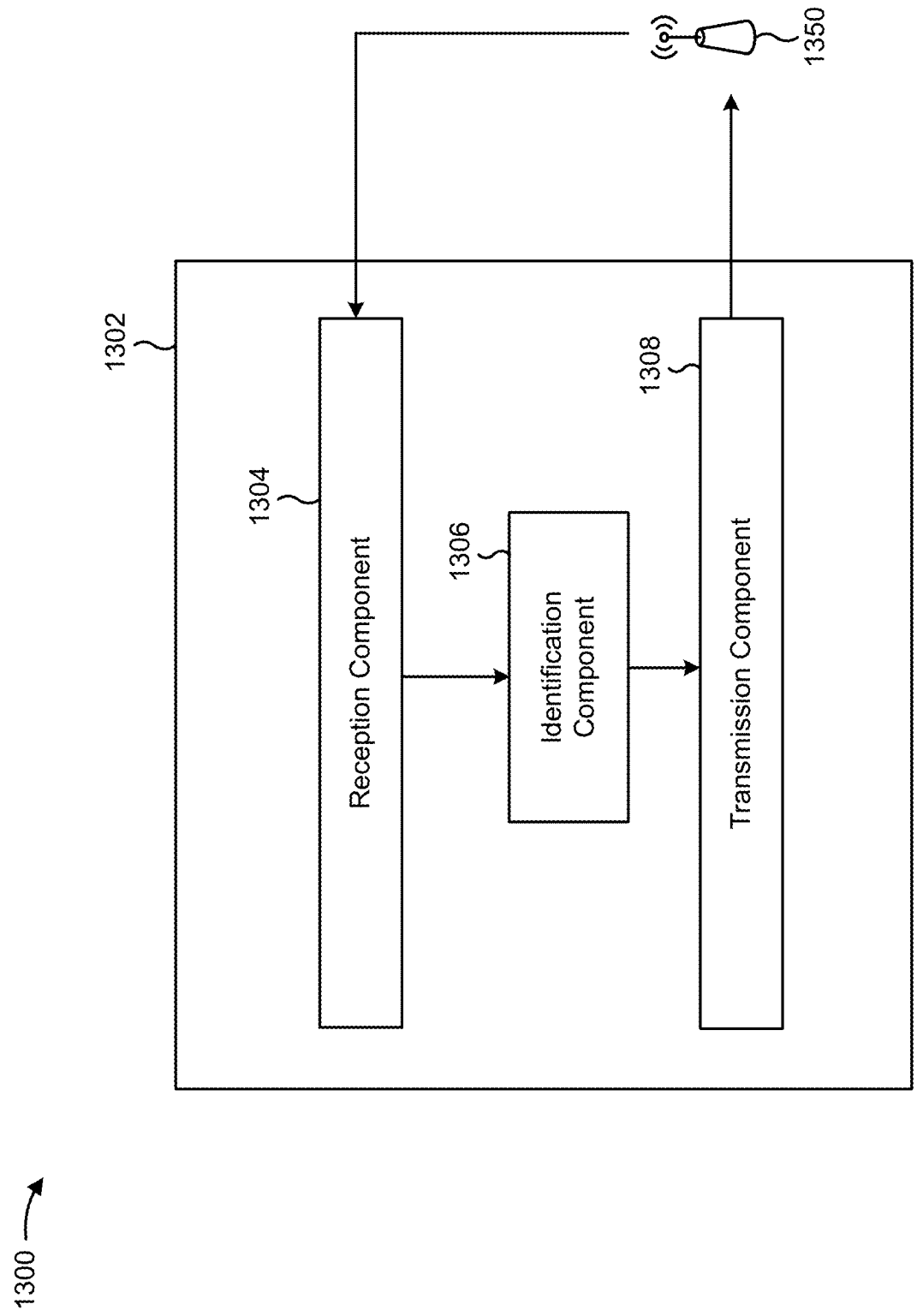
FIG. 13 is a conceptual data flow diagram illustrating the data flow between different components in an example apparatus.

FIG. 13 is a conceptual data flow diagram 1300 illustrating the data flow between different components in an example apparatus 1302. The apparatus 1302 may be a network device (e.g., network device(s) 130). In some aspects, the apparatus 1302 includes a reception component 1304, an identification component 1306, and/or a transmission component 1308.

In some aspects, the reception component 1304 may receive (e.g., from an apparatus 1350, such as a USS device, a NEF/SCEF, and/or the like) information that identifies a UE and a format of a plurality of formats for reporting flight path information. In some aspects, the reception component 1304 may receive the information that identifies the UE and the format for reporting flight path information based at least in part on authorization of a flight plan of the UE (e.g., by a USS device).

In some aspects, the identification component 1306 may identify a base station that serves the UE. In some aspects, the identification component 1306 may obtain an indicator of the base station that serves the UE from a storage or from an MME/AMF that serves the UE (e.g., using reception component 1304 and/or transmission component 1308).

In some aspects, the transmission component 1308 may transmit a format indicator that identifies the format and a UE identifier that identifies the UE to the base station identified by the identification component 1306. In some aspects, the UE identifier may be the same as the information that identifies the UE received by the reception component 1304. Additionally, or alternatively, the UE identifier may be determined based at least in part on the information that identifies the UE received by the reception component 1304.

The apparatus may include additional components that perform each of the blocks of the algorithm in the aforementioned method 800 of FIG. 8 and/or the like. Each block in the aforementioned method 800 of FIG. 8 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of components (e.g., one or more components) shown in FIG. 13 may perform one or more functions described as being performed by another set of components shown in FIG. 13.

Figure 14:
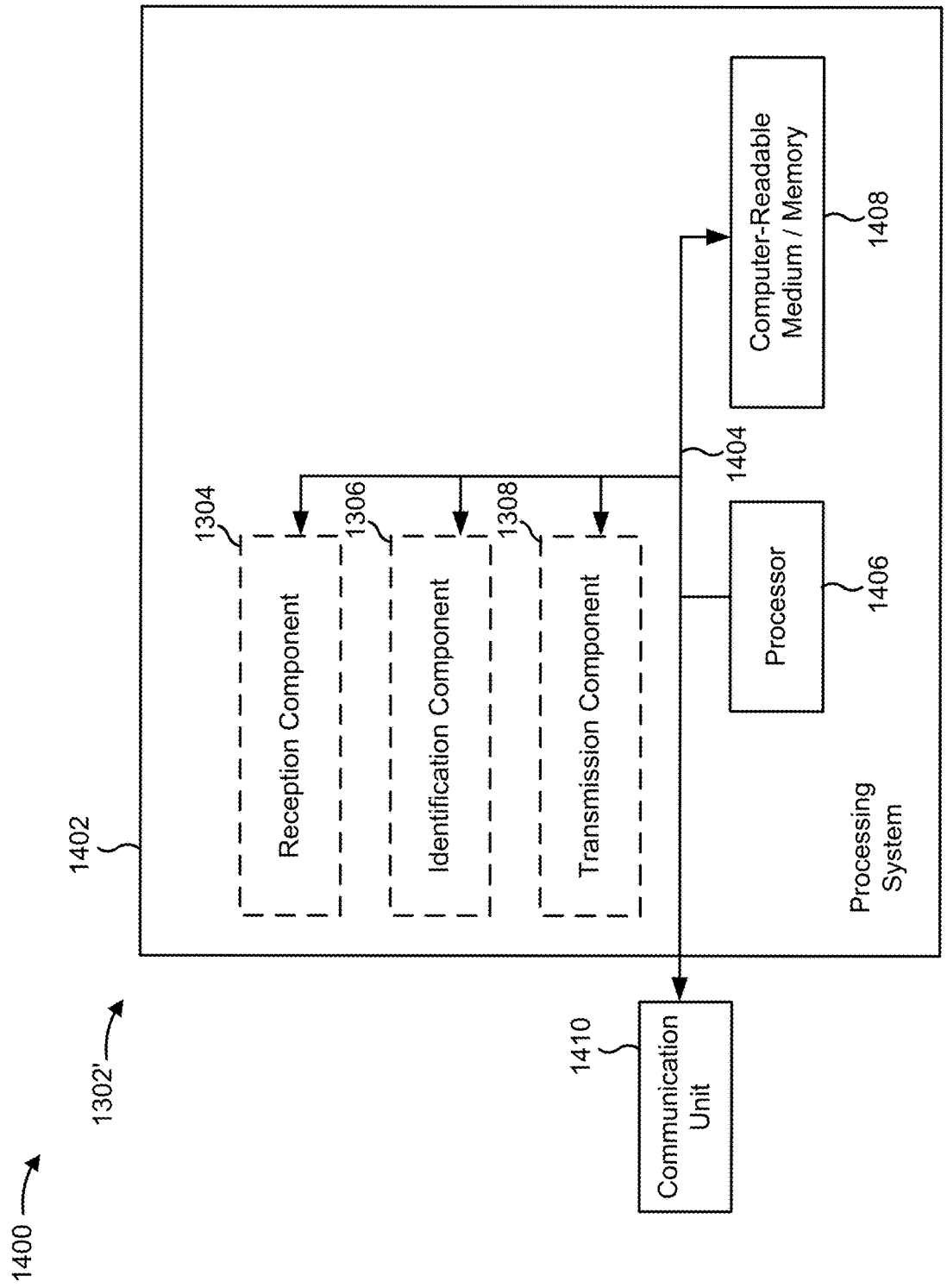
FIG. 14 is a diagram illustrating an example of a hardware implementation for an apparatus employing a processing system.

FIG. 14 is a diagram 1400 illustrating an example of a hardware implementation for an apparatus 1302' employing a processing system 1402. The apparatus 1302' may be a network device (e.g., network device(s) 130).

The processing system 1402 may be implemented with a bus architecture, represented generally by the bus 1404. The bus 1404 may include any number of interconnecting buses and bridges depending on the specific application of the processing system 1402 and the overall design constraints. The bus 1404 links together various circuits including one or more processors and/or hardware components, represented by the processor 1406, the components 1304, 1306, and/or 1308, and the computer-readable medium/memory 1408. The bus 1404 may also link various other circuits such as timing sources, peripherals, voltage regulators, and power management circuits, which are well known in the art, and therefore will not be described any further.

The processing system 1402 may be coupled to a communication unit 1410. The communication unit 1410 a means for communicating with various other apparatuses over a wired or wireless connection. The communication unit 1410 receives a signal, extracts information from the received signal, and provides the extracted information to the processing system 1402, specifically the reception component 1304. In addition, the communication unit 1410 receives information from the processing system 1402, specifically the transmission component 1308, and based at least in part on the received information, generates a signal to be sent over the wired or wireless connection. The processing system 1402 includes a processor 1406 coupled to a computer-readable medium/memory 1408. The processor 1406 is responsible for general processing, including the execution of software stored on the computer-readable medium/memory 1408. The software, when executed by the processor 1406, causes the processing system 1402 to perform the various functions described herein for any particular apparatus. The computer-readable medium/memory 1408 may also be used for storing data that is manipulated by the processor 1406 when executing software. The processing system further includes at least one of the components 1304, 1306, and/or 1308. The components may be software modules running in the processor 1406, resident/stored in the computer-readable medium/memory 1408, one or more hardware modules coupled to the processor 1406, or some combination thereof. The processing system 1402 may be a component of the network device(s) 130 and may include the memory 292 and/or the controller/processor 290.

In some aspects, the apparatus 1302/1302' for wireless communication includes means for receiving information that identifies a UE and a format of a plurality of formats for reporting flight path information by the UE; means for identifying a base station that serves the UE; means for transmitting, to the base station, a format indicator that identifies the format and a UE identifier that identifies the UE; and/or the like. The aforementioned means may be one or more of the aforementioned components of the apparatus 1302 and/or the processing system 1402 of the apparatus 1302' configured to perform the functions recited by the aforementioned means. As described elsewhere herein, the processing system 1402 may include the controller/processor 290. In one configuration, the aforementioned means may be the controller/processor 290 configured to perform the functions and/or operations recited herein.

FIG. 14 is provided as an example. Other examples may differ from what is described in connection with FIG. 14.

It should be understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following provides an overview of some Aspects of the present disclosure:

Aspect 1: A method of wireless communication performed by a user equipment (UE), comprising: receiving an indication of a format of a plurality of formats for reporting flight path information to a network node; receiving a request for the flight path information; and transmitting the flight path information to the network node according to the format and based at least in part on receiving the request for the flight path information.

Aspect 2: The method of Aspect 1, wherein the plurality of formats includes at least a waypoint format and a polygon format.

Aspect 3: The method of any of Aspects 1-2, wherein the format for reporting the flight path information is indicated in at least one of a configuration message or a non-access stratum message.

Aspect 4: The method of Aspect 3, wherein the format for reporting the flight path information is indicated in a flight path information report configuration information element of the configuration message.

Aspect 5: The method of any of Aspects 1-4, wherein the request is indicated using a flight path information request field of a UE information request message.

Aspect 6: The method of any of Aspects 1-5, wherein the flight path information is transmitted in a flight path information report.

Aspect 7: The method of any of Aspects 1-6, wherein the flight path information indicates at least one of: respective times that the UE is expected to arrive at waypoints of a set of waypoints indicated in the flight path information if the format is a waypoint format, or respective times that the UE is expected to occupy polygons of a set of polygons indicated in the flight path information if the format is a polygon format.

Aspect 8: The method of Aspect 7, wherein the respective times that the UE is expected to occupy the polygons of the set of polygons include at least one of: respective times that the UE is expected to enter the polygons, respective times that the UE is expected to exit the polygons, respective durations of time that the UE is expected to occupy the polygons, or a combination thereof.

Aspect 9: A method of wireless communication performed by a network node, comprising: transmitting, to a user equipment (UE), an indication of a format of a plurality of formats for reporting flight path information of the UE; transmitting, to the UE, a request for the flight path information; and receiving the flight path information from the UE according to the format and based at least in part on transmitting the request for the flight path information.

Aspect 10: The method of Aspect 9, wherein the format is a static format stored in memory of the UE.

Aspect 11: The method of any of Aspects 9-10, wherein the format is determined based at least in part on a format indicator and a UE identifier that identifies the UE, wherein the format indicator and the UE identifier are received from a network device in a core network associated with the network node.

Aspect 12: The method of Aspect 11, wherein the format indicator and the UE identifier are received based at least in part on authorization of a flight plan of the UE.

Aspect 13: The method of any of Aspects 9-12, wherein the plurality of formats includes at least a waypoint format and a polygon format.

Aspect 14: The method of any of Aspects 9-13, wherein the format for reporting the flight path information is indicated in at least one of a configuration message or a non-access stratum message.

Aspect 15: The method of Aspect 14, wherein the format for reporting the flight path information is indicated in a flight path information report configuration information element of the configuration message.

Aspect 16: The method of any of Aspects 9-15, wherein the request is indicated using a flight path information request field of a UE information request message.

Aspect 17: The method of any of Aspects 9-16, wherein the flight path information is received in a flight path information report.

Aspect 18: The method of any of Aspects 9-17, wherein the flight path information indicates at least one of: respective times that the UE is expected to arrive at waypoints of a set of waypoints indicated in the flight path information if the format is a waypoint format, or respective times that the UE is expected to occupy polygons of a set of polygons indicated in the flight path information if the format is a polygon format.

Aspect 19: The method of Aspect 18, wherein the respective times that the UE is expected to occupy the polygons of the set of polygons include at least one of: respective times that the UE is expected to enter the polygons, respective times that the UE is expected to exit the polygons, respective durations of time that the UE is expected to occupy the polygons, or a combination thereof.

Aspect 20: A method of wireless communication performed by a network device, comprising: receiving information that identifies a user equipment (UE) and a format of a plurality of formats for reporting flight path information by the UE; identifying a base station that serves the UE; and transmitting, to the base station, a format indicator that identifies the format and a UE identifier that identifies the UE.

Aspect 21: The method of Aspect 20, wherein the information that identifies the UE and the format are received based at least in part on authorization of a flight plan of the UE.

Aspect 22: The method of any of Aspects 20-21, wherein the format indicator and the UE identifier are transmitted to the base station based at least in part on authorization of a flight plan of the UE.

Aspect 23: The method of any of Aspects 20-22, wherein the information that identifies the UE and the format are received from an unmanned aircraft systems service supplier (USS) device or from a core network device that communicates with the USS device.

Aspect 24: The method of Aspect 23, wherein the information that identifies the UE and the format are received from the USS device via a service capability exposure function (SCEF) application programming interface (API) or a network exposure function (NEF) API.

Aspect 25: The method of any of Aspects 20-24, wherein the information that identifies the UE includes at least one of an unmanned aerial vehicle identifier, a general public subscription identifier, or a combination thereof.

Aspect 26: The method of any of Aspects 20-25, wherein the UE identifier includes at least one of an unmanned aerial vehicle identifier, a general public subscription identifier, or a combination thereof.

Aspect 27: The method of any of Aspects 20-26, wherein the plurality of formats includes at least a waypoint format and a polygon format.

Aspect 28: An apparatus for wireless communication at a device, comprising a processor; memory coupled with the processor; and instructions stored in the memory and executable by the processor to cause the apparatus to perform the method of one or more of Aspects 1-8.

Aspect 29: A device for wireless communication, comprising a memory and one or more processors coupled to the memory, the memory and the one or more processors configured to perform the method of one or more of Aspects 1-8.

Aspect 30: An apparatus for wireless communication, comprising at least one means for performing the method of one or more of Aspects 1-8.

Aspect 31: A non-transitory computer-readable medium storing code for wireless communication, the code comprising instructions executable by a processor to perform the method of one or more of Aspects 1-8.

Aspect 32: A non-transitory computer-readable medium storing a set of instructions for wireless communication, the set of instructions comprising one or more instructions that, when executed by one or more processors of a device, cause the device to perform the method of one or more of Aspects 1-8.

Aspect 33: An apparatus for wireless communication at a device, comprising a processor; memory coupled with the processor; and instructions stored in the memory and executable by the processor to cause the apparatus to perform the method of one or more of Aspects 9-19.

Aspect 34: A device for wireless communication, comprising a memory and one or more processors coupled to the memory, the memory and the one or more processors configured to perform the method of one or more of Aspects 9-19.

Aspect 35: An apparatus for wireless communication, comprising at least one means for performing the method of one or more of Aspects 9-19.

Aspect 36: A non-transitory computer-readable medium storing code for wireless communication, the code comprising instructions executable by a processor to perform the method of one or more of Aspects 9-19.

Aspect 37: A non-transitory computer-readable medium storing a set of instructions for wireless communication, the set of instructions comprising one or more instructions that, when executed by one or more processors of a device, cause the device to perform the method of one or more of Aspects 9-19.

Aspect 38: An apparatus for wireless communication at a device, comprising a processor; memory coupled with the processor; and instructions stored in the memory and executable by the processor to cause the apparatus to perform the method of one or more of Aspects 20-27.

Aspect 39: A device for wireless communication, comprising a memory and one or more processors coupled to the memory, the memory and the one or more processors configured to perform the method of one or more of Aspects 20-27.

Aspect 40: An apparatus for wireless communication, comprising at least one means for performing the method of one or more of Aspects 20-27.

Aspect 41: A non-transitory computer-readable medium storing code for wireless communication, the code comprising instructions executable by a processor to perform the method of one or more of Aspects 20-27.

Aspect 42: A non-transitory computer-readable medium storing a set of instructions for wireless communication, the set of instructions comprising one or more instructions that, when executed by one or more processors of a device, cause the device to perform the method of one or more of Aspects 20-27.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
receiving an indication of a flight path format of a plurality of flight path formats configured for flight path information that is reported to a network node,
wherein the plurality of flight path formats include at least a waypoint flight path format and a volume flight path format that indicates a set of multiple polygons the UE is expected to occupy;

receiving a request for the flight path information; and transmitting the flight path information to the network node according to the flight path format and based at least in part on receiving the request for the flight path information.

2. The method of claim 1, wherein the flight path format for reporting the flight path information is indicated in at least one of a configuration message or a non-access stratum message.

3. The method of claim 2, wherein the flight path format for reporting the flight path information is indicated in a flight path information report configuration information element of the configuration message.

4. The method of claim 1, wherein the request is indicated using a flight path information request field of a UE information request message.

5. The method of claim 1, wherein the flight path information is transmitted in a flight path information report.

6. The method of claim 1, wherein the flight path information indicates at least one of:
respective times that the UE is expected to arrive at waypoints of a set of waypoints indicated in the flight path information if the flight path format is the waypoint flight path format, or
respective times that the UE is expected to occupy polygons of the set of multiple polygons if the format is the volume flight path format.

7. The method of claim 6, wherein the respective times that the UE is expected to occupy the polygons of the set of multiple polygons include at least one of:
respective times that the UE is expected to enter the polygons,
respective times that the UE is expected to exit the polygons,
respective durations of time that the UE is expected to occupy the polygons, or
a combination thereof.

8. A method of wireless communication performed by a network node, comprising:
transmitting, to a user equipment (UE), an indication of a flight path format of a plurality of flight path formats configured for flight path information that is reported to the network node,
wherein the plurality of flight path formats include at least a waypoint flight path format and a volume flight path format that indicates a set of multiple polygons the UE is expected to occupy;
transmitting, to the UE, a request for the flight path information; and
receiving the flight path information from the UE according to the flight path format and based at least in part on transmitting the request for the flight path information.

9. The method of claim 8, wherein the flight path format is determined based at least in part on a format indicator and a UE identifier that identifies the UE, wherein the format indicator and the UE identifier are received from a network device in a core network associated with the network node.

10. The method of claim 9, wherein the format indicator and the UE identifier are received based at least in part on authorization of a flight plan of the UE.

11. The method of claim 8, wherein the flight path format for reporting the flight path information is indicated in at least one of a configuration message or a non-access stratum message.

12. The method of claim 11, wherein the flight path format for reporting the flight path information is indicated in a flight path information report configuration information element of the configuration message.

13. The method of claim 8, wherein the request is indicated using a flight path information request field of a UE information request message.

14. The method of claim 8, wherein the flight path information is received in a flight path information report.

15. The method of claim 8, wherein the flight path information indicates at least one of:
respective times that the UE is expected to arrive at waypoints of a set of waypoints indicated in the flight path information if the flight path format is the waypoint flight path format, or
respective times that the UE is expected to occupy polygons of the set of multiple polygons if the format is the volume flight path format.

16. The method of claim 15, wherein the respective times that the UE is expected to occupy the polygons of the set of multiple polygons include at least one of:
respective times that the UE is expected to enter the polygons,
respective times that the UE is expected to exit the polygons,
respective durations of time that the UE is expected to occupy the polygons, or
a combination thereof.

17. A method of wireless communication performed by a network device, comprising:
receiving information that identifies a user equipment (UE) and a flight path format of a plurality of flight path formats configured for flight path information that is reported by the UE to a base station,
wherein the plurality of flight path formats include at least a waypoint flight path format and a volume flight path format that indicates a set of multiple polygons the UE is expected to occupy; and
transmitting, to the base station, a format indicator that identifies the flight path format and a UE identifier that identifies the UE.

18. The method of claim 17, wherein the information that identifies the UE and the flight path format are received based at least in part on authorization of a flight plan of the UE.

19. The method of claim 17, wherein the format indicator and the UE identifier are transmitted to the base station based at least in part on authorization of a flight plan of the UE.

20. The method of claim 17, wherein the information that identifies the UE and the flight path format are received from an unmanned aircraft systems service supplier (USS) device or from a core network device that communicates with the USS device.

21. The method of claim 20, wherein the information that identifies the UE and the flight path format are received from the USS device via a service capability exposure function (SCEF) application programming interface (API) or a network exposure function (NEF) API.

22. The method of claim 17, wherein the information that identifies the UE includes at least one of an unmanned aerial vehicle identifier, a general public subscription identifier, or a combination thereof.

23. The method of claim 17, wherein the UE identifier includes at least one of an unmanned aerial vehicle identifier, a general public subscription identifier, or a combination thereof.

24. A user equipment (UE) for wireless communication, comprising:
  one or more memories; and
  one or more processors, coupled to the one or more memories, which are configured, individually or in any combination, to:
  receive an indication of a flight path format of a plurality of flight path formats configured for flight path information that is reported to a network node,
    wherein the plurality of flight path formats include at least a waypoint flight path format and a volume flight path format that indicates a set of multiple polygons the UE is expected to occupy;
  receive a request for the flight path information; and
  transmit the flight path information to the network node according to the flight path format and based at least in part on receiving the request for the flight path information.

25. The UE of claim 24, wherein the flight path information is transmitted in a flight path information report.

26. The method of claim 1, wherein receiving the indication of the flight path format is based at least in part on an authorization of a flight plan of the UE.

27. The UE of claim 24, wherein the flight path format for reporting the flight path information is indicated in at least one of a configuration message or a non-access stratum message.

28. The UE of claim 27, wherein the flight path format for reporting the flight path information is indicated in a flight path information report configuration information element of the configuration message.

29. The UE of claim 24, wherein the request is indicated using a flight path information request field of a UE information request message.

30. The UE of claim 24, wherein receiving the indication of the flight path format is based at least in part on an authorization of a flight plan of the UE.

* * * * *